(12) United States Patent
Im et al.

(10) Patent No.: US 9,726,805 B2
(45) Date of Patent: Aug. 8, 2017

(54) BACKLIGHT ASSEMBLY, DISPLAY APPARATUS HAVING THE SAME AND METHOD OF MANUFACTURING THE SAME

(71) Applicant: Samsung Display Co., Ltd., Yongin, Gyeonggi-Do (KR)

(72) Inventors: Hyun-Deok Im, Seoul (KR); Jong-Hyuk Kang, Suwon-si (KR); Jung-Hyun Kwon, Seoul (KR); Hae-Il Park, Seoul (KR); Hyun-Min Cho, Hwaseong-si (KR); Oleg Prudnikov, Hwaseong-si (KR); Jae-Byung Park, Seoul (KR); Dong-Hoon Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 300 days.

(21) Appl. No.: 14/281,674

(22) Filed: May 19, 2014

(65) Prior Publication Data

US 2015/0085522 A1    Mar. 26, 2015

(30) Foreign Application Priority Data

Sep. 24, 2013   (KR) .......................... 10-2013-0113464

(51) Int. Cl.
*F21V 8/00*       (2006.01)
(52) U.S. Cl.
CPC ........... *G02B 6/0055* (2013.01); *G02B 6/005* (2013.01); *G02B 6/0035* (2013.01);
(Continued)

(58) Field of Classification Search
CPC .. G02B 6/0043; G02B 6/0068; G02B 6/0026; G02B 6/0065
See application file for complete search history.

(56) References Cited

U.S. PATENT DOCUMENTS 8,834,001 B2 * 9/2014 Lin ...................... G02B 6/0011
362/612
2007/0008763 A1 * 1/2007 Choi ........................ G11C 8/12
365/63

(Continued)

FOREIGN PATENT DOCUMENTS

KR    10-2012-0087400 A    8/2012
KR    10-2013-0002781 A    1/2013

(Continued)

*Primary Examiner* — Jong-Suk (James) Lee
*Assistant Examiner* — Christopher E Dunay
(74) *Attorney, Agent, or Firm* — Lewis Roca Rothgerber Christie LLP

(57) ABSTRACT

A backlight assembly includes a first light source part including a plurality of first light sources configured to generate light having a first color and a plurality of second light sources configured to generate light having a second color different from the first color, and a light guiding plate including a first incident surface and an exiting surface adjacent to the first incident surface. The exiting surface is configured to allow the light to pass therethrough. The exiting surface includes a first peripheral portion configured to absorb the light having the second color and a central portion adjacent to the first peripheral portion and configured to allow the light to pass therethrough. The first and second light sources are alternately located.

17 Claims, 13 Drawing Sheets

(52) U.S. Cl.
CPC ......... *G02B 6/0061* (2013.01); *G02B 6/0068* (2013.01); *G02B 6/0065* (2013.01)

(56) References Cited

U.S. PATENT DOCUMENTS

| | | | | |
|---|---|---|---|---|
| 2007/0046176 | A1* | 3/2007 | Bukesov | C09K 11/08 313/496 |
| 2007/0263409 | A1* | 11/2007 | Mok | G02B 6/0026 362/612 |
| 2008/0192465 | A1* | 8/2008 | Huang | G02F 1/133603 362/231 |
| 2010/0055401 | A1* | 3/2010 | Choi | G02B 6/0053 428/156 |
| 2010/0253872 | A1* | 10/2010 | Park | G02B 6/0031 349/58 |
| 2010/0328574 | A1* | 12/2010 | Gourlay | G02B 6/0021 349/62 |
| 2012/0113676 | A1* | 5/2012 | Van Dijk | G02B 6/0036 362/606 |
| 2012/0120678 | A1* | 5/2012 | Su | G02B 6/0025 362/607 |
| 2012/0133857 | A1* | 5/2012 | Kim | G09F 13/04 349/58 |
| 2012/0140436 | A1* | 6/2012 | Yang | F21V 13/02 362/84 |
| 2013/0148055 | A1* | 6/2013 | Chen | G02B 6/0038 349/62 |
| 2015/0062490 | A1* | 3/2015 | Kwon | G02F 1/133621 349/64 |

FOREIGN PATENT DOCUMENTS

| | | |
|---|---|---|
| KR | 10-2013-0011404 A | 1/2013 |
| KR | 10-2013-0126396 A | 11/2013 |

* cited by examiner

BACKLIGHT ASSEMBLY, DISPLAY APPARATUS HAVING THE SAME AND METHOD OF MANUFACTURING THE SAME

CROSS-REFERENCE TO RELATED APPLICATION

This application claims priority to and the benefit of Korean Patent Application No. 10-2013-0113464, filed on Sep. 24, 2013 in the Korean Intellectual Property Office, the disclosure of which is incorporated by reference herein in its entirety.

BACKGROUND

1. Field

Example embodiments of the present invention are directed toward a backlight assembly, a display apparatus including the backlight assembly, and a method of manufacturing the backlight assembly.

2. Description of the Related Art

Recently, a display apparatus having light weight and small size has been manufactured. A cathode ray tube (CRT) display apparatus has been used due to performance and a competitive price. However the CRT display apparatus has a weakness with size and portability. Therefore a liquid crystal display apparatus has been highly regarded due to smaller size, lighter weight, and lower power-consumption of the liquid crystal display apparatus.

The liquid crystal display apparatus applies a voltage to a specific molecular arrangement configured to change according to the applied voltage. The liquid crystal display apparatus displays an image using changes in various optical properties (for example, birefringence, rotatory polarization, dichroism, and light scattering) of a liquid crystal cell according to the changes of the molecular arrangement.

The liquid crystal display apparatus includes a liquid crystal display panel and a backlight assembly to provide light (e.g., a light source) to the liquid crystal display panel. When the backlight assembly includes light sources emitting (e.g., having) more than two colors, problems including light leakage at a light incident portion, a hot-spot in a display area, and/or color stains in the display area may occur.

SUMMARY

Aspects of one or more example embodiments of the present invention relate to a display apparatus for a liquid crystal display apparatus including the backlight assembly and a method of manufacturing the backlight assembly.

Aspects of one or more example embodiment of the invention provide a backlight assembly capable of improving quality of exiting light Aspects of one or more example embodiments of the invention also provide a display apparatus having the backlight assembly.

According to an example embodiment of the invention, a backlight assembly includes a first light source part including a plurality of first light sources configured to generate light having a first color and a plurality of second light sources configured to generate light having a second color different from the first color, and a light guiding plate including a first incident surface and an exiting surface adjacent to the first incident surface. The exiting surface configured to allow the light to pass therethrough. The exiting surface includes a first peripheral portion configured to absorb the light having the second color and a central portion adjacent to the first peripheral portion and configured to allow the light to pass therethrough. The first and second light sources are alternately located.

In an example embodiment, the second light source may be at a first end of the first light source part. The first peripheral portion may be located to correspond to the second light source and extend in a direction substantially perpendicular to the first incident surface.

In an example embodiment, a pattern may be generated utilizing ink which is configured to absorb the light having the second color on the first peripheral portion.

In an example embodiment, the pattern may include a plurality of fine dots.

In an example embodiment, the backlight assembly may further include a first sheet on the exiting surface of the light guiding plate. An upper surface of the first sheet may include a first peripheral portion, and the first peripheral portion may include a pattern generated utilizing ink which is configured to absorb the light having the second color.

In an example embodiment, the backlight assembly may further include a second sheet under the light guiding plate. A first phosphor pattern may be on the second sheet, adjacent to the first incident surface, and extend substantially parallel to the first incident surface and on the second sheet. The first phosphor pattern may include phosphor configured to change the light having the second color into white light.

In an example embodiment, the light guiding plate may further include a reflecting surface opposite to the exiting surface, and a first phosphor pattern adjacent to the first incident surface and extending substantially parallel to the first incident surface. The first phosphor pattern may include phosphor configured to change the light having the second color into white light.

In an example embodiment, the backlight assembly may further include a second light source at a second end of the first light source part, the second end of the first light source part being opposite to the first end of the first light source part. The exiting surface of the light guiding plate may further include a second peripheral portion. The second peripheral portion may be located to correspond to the second light source and extend substantially perpendicular to the first incident surface. The second peripheral portion may be configured to partially absorb the light having the second color.

In an example embodiment, the backlight assembly may include a second light source part facing the first light source part. The second light source part may include a plurality of first light sources configured to generate light having the first color, and a plurality of second light sources configured to generate light having the second color different from the first color. The first and second light sources may be alternately located. The second light source may be at a first end of the first light source part. The light guiding plate may be between the first light source part and the second light source part.

In an example embodiment, a wavelength of the light having the first color may be greater than a wavelength of the light having the second color.

In an example embodiment, the first color may be yellow and the second color may be blue.

According to another example embodiment of the invention, a backlight assembly includes a first light source part including a plurality of first light sources configured to generate light having a first color and a plurality of second light sources configured to generate light having a second color different from the first color, and a light guiding plate including a first incident surface, an exiting surface adjacent to the first incident surface and configured to allow the light to pass therethrough, and a reflecting surface opposite to the exiting surface. The first and second light sources are alternately located.

In an example embodiment, the backlight assembly may further include a first sheet on the exiting surface of the light guiding plate, and an upper surface of the first sheet may include a first peripheral portion including a pattern generated utilizing ink and configured to absorb the light having the second color.

In an example embodiment, the backlight assembly may further include a second sheet under the light guiding plate. A first phosphor pattern may be on the second sheet, adjacent to the first incident surface, and extend substantially parallel to the first incident surface. The first phosphor pattern may include phosphor configured to change the light having the second color into white light.

According to still another example embodiment of the invention, a display apparatus includes a display panel including a first subpixel configured to display a first primary color, a second subpixel configured to display a second primary color, and a transparent subpixel, a backlight assembly configured to provide light to the display panel, and a receiving container accommodating the display panel and the backlight assembly. The backlight assembly includes a first light source part including a plurality of first light sources configured to generate light having a first color and a plurality of second light sources configured to generate light having a second color different from the first color, and a light guiding plate including a first incident surface and an exiting surface adjacent to the first incident surface. The first and second light sources are alternately located. The first color is a mixed color comprising the first primary color and the second primary color. The second color is the second primary color. The exiting surface includes a first peripheral portion configured to partially absorb the light having the second color and a central portion adjacent to the first peripheral portion and configured to allow the light to pass therethrough.

In an example embodiment, the first primary color may be red, the second primary color may be green, a third primary color may be blue, and the first color may be yellow.

In an example embodiment, the display panel may include a display area configured to display an image and a peripheral area surrounding the display area which is a non-displaying area. The light guiding plate may further include a first phosphor pattern adjacent to the first incident surface and extending substantially parallel to the first incident surface. The first phosphor pattern may include phosphor configured to change the light having the second color into white light. The first phosphor pattern may be located to correspond to the peripheral area of the display panel.

In an example embodiment, the display apparatus may further include a first sheet on the exiting surface of the light guiding plate. An upper surface of the first sheet may include a first peripheral portion, the first peripheral portion may include a pattern generated utilizing ink and configured to absorb the light having the second color.

In an example embodiment, a first phosphor pattern may be on a lower surface of the first sheet adjacent to the first incident surface and extends substantially parallel to the first incident surface. The lower surface may be opposite to the upper surface of the first sheet. The first phosphor pattern may include phosphor configured to change the light having the second color into white light.

According to still another example embodiment of the invention, a method of manufacturing a backlight assembly includes forming a first light source part, the first light source part including a plurality of first light sources configured to generate light having a first color, and a plurality of second light sources configured to generate light having a second color different from the first color, the first and second light sources being alternately located; and forming a light guiding plate, the light guiding plate including a first incident surface and an exiting surface adjacent to the first incident surface configured to allow the light to pass therethrough, and a reflecting surface opposite to the exiting surface. Forming the light guiding plate includes forming a light exiting pattern on the exiting surface; and forming first and second absorbing patterns by depositing ink on the exiting surface through a mask, the mask including a first portion having a plurality of openings, a second portion spaced from the first portion and having a plurality of openings, and a third portion between the first portion and the second portion, the ink configured to absorb light having a wavelength within a range.

According to aspects of embodiments of the present invention, the backlight assembly includes light source parts generating light having more than two colors, and a light guiding plate having first and second peripheral portions which absorb light having a wavelength within a specific range, such that specific color line stains may be reduced.

In addition, the backlight assembly includes a first phosphor pattern which changes light having the specific wavelength into white light, so that visibility of light leakage adjacent to light sources and hot spot may be reduced.

BRIEF DESCRIPTION OF THE DRAWINGS

The above and other features of the invention will become more apparent by describing in detail example embodiments thereof with reference to the accompanying drawings, in which.

DETAILED DESCRIPTION

It will be understood that when an element such as a layer, film, region, or substrate is referred to as being "on" another element, it can be directly on the other element or intervening elements may also be present. In contrast, when an element is referred to as being "directly on" another element, there are no intervening elements present. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, aspects of the present invention will be explained in detail with reference to the accompanying drawings.

Figure 1:
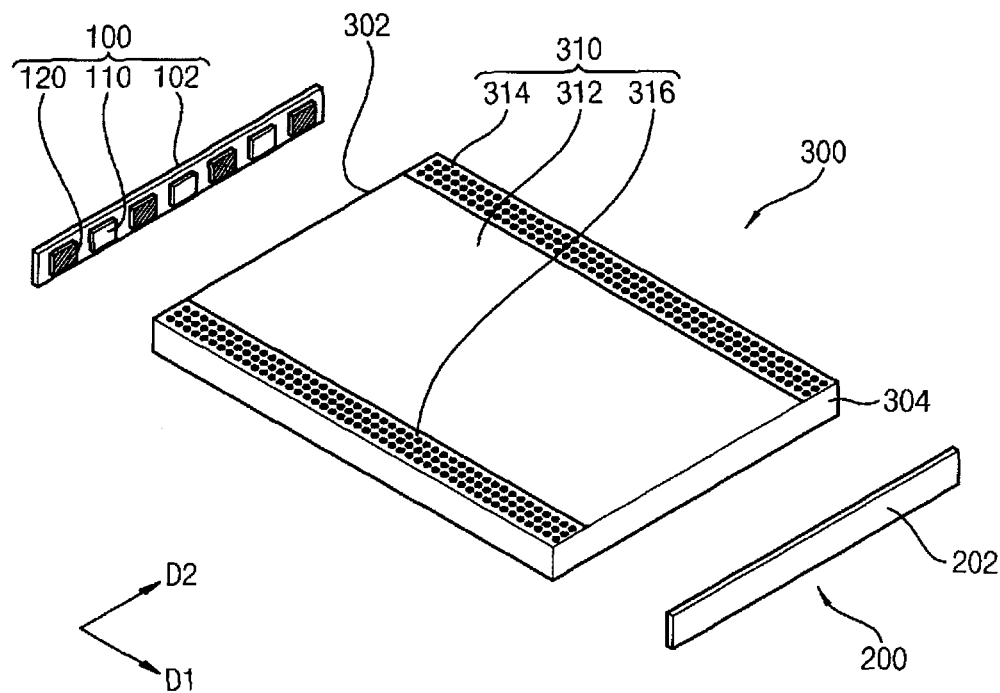
FIG. 1 is an exploded perspective view illustrating a backlight assembly according to an example embodiment of the invention.
Figure 2:
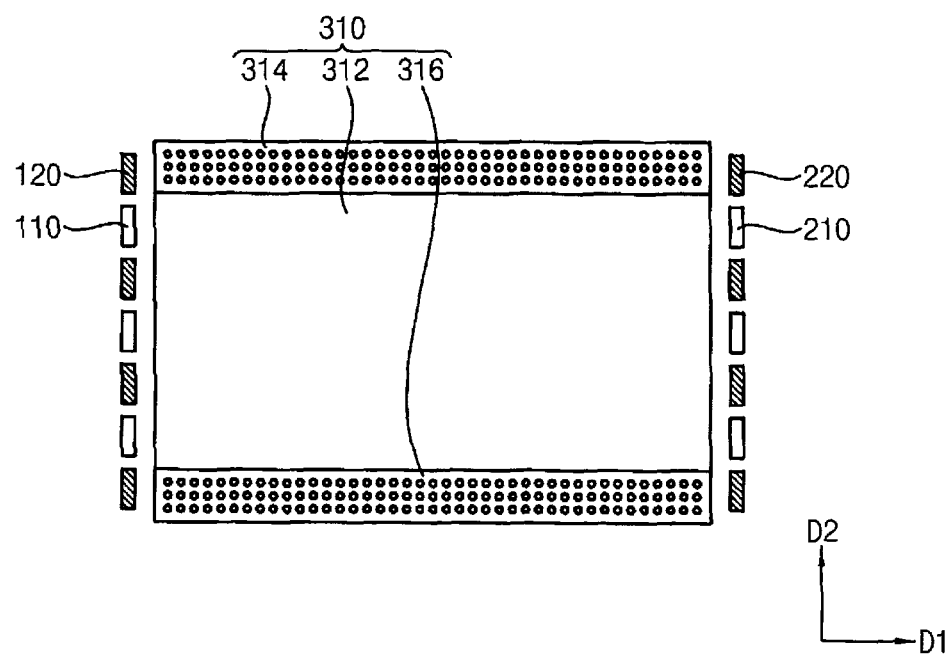
FIG. 2 is a plan view of the backlight assembly shown in FIG. 1.
Figure 3:
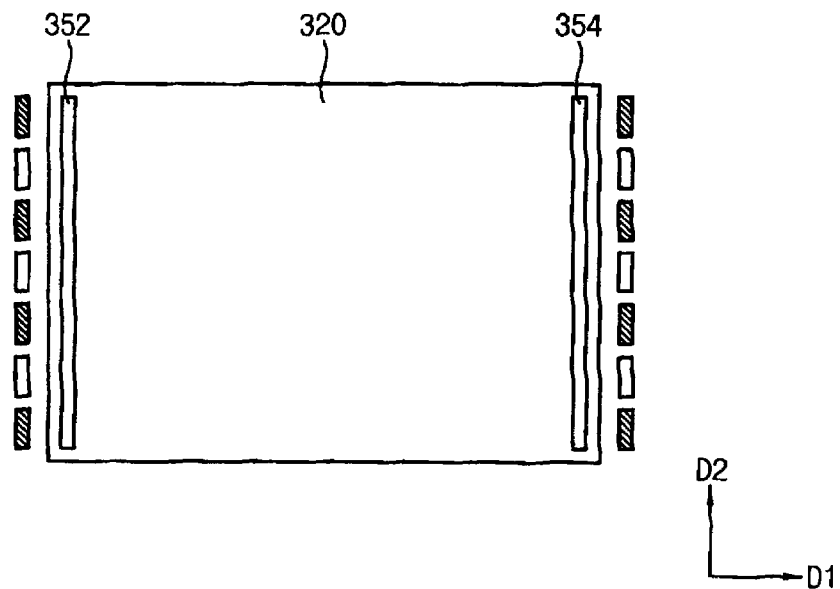
FIG. 3 is a bottom view of the backlight assembly shown in FIG. 1.

FIG. 1 is an exploded perspective view illustrating a backlight assembly according to an example embodiment of the invention. FIG. 2 is a plan view of the backlight assembly shown in FIG. 1. FIG. 3 is a bottom view of the backlight assembly shown in FIG. 1.

Referring to FIGS. 1 to 3, a backlight assembly includes a first light source part 100, a second light source part 200, and a light guiding plate 300.

The first light source part 100 includes a first substrate 102, a plurality of first light sources 110, and a plurality of second light sources 120.

The first substrate 102 includes a driving circuit to drive the first and second light sources 110 and 120. The first substrate 102 may be a printed circuit board (PCB). The first substrate 102 extends in a second direction D2 which crosses a first direction D1 (e.g., the second direction D2 may be substantially perpendicular to the first direction D1).

The first light sources 110 and the second light sources 120 are alternately disposed (e.g., alternately located) along the second direction D2 on the first substrate 102.

Each of the first light sources 110 emits light having a mixed color including a first primary color and a second primary color. Each of the second light sources 120 emits light having a third primary color. The first through third primary colors will be further described in regards to FIGS. 13A and 13B.

The second light sources 120 are disposed at both ends of the first substrate 102 (e.g., at both ends of the first substrate 102 along the second direction D2). Each of the second light sources 120 may be a light source generating a short wavelength light. For example, each of the second light sources 120 may be a light emitting diode (LED) chip generating a blue light.

Each of the first light sources 110 is disposed between adjacent second light sources 120. Each of the first light sources 110 may be a light source generating a long wavelength light. For example, each of the first light sources 110 may be a light emitting diode (LED) chip generating a yellow light.

The second light source part 200 is spaced from (e.g., spaced apart from) the first light source part 100 in the first direction D1 and faces (e.g., is opposite) the first light source part 100. The second light source part 200 includes a second substrate 202, a plurality of first light sources 210, and a plurality of second light sources 220.

The second substrate 202 includes a driving circuit to drive the first and second light sources 210 and 220. The second substrate 202 may be a printed circuit board (PCB). The second substrate 202 extends in the second direction D2.

The first light sources 210 and the second light sources 220 are alternately disposed along the second direction D2 on the second substrate 202.

Each of the first light sources 210 emits light having a mixed color of the first primary color and the second primary color. Each of the second light sources 220 emits light having the third primary color. The first through third primary colors will be further described in regards to FIGS. 13A and 13B.

The second light sources 220 are disposed at both ends of the second substrate 202 (e.g., at both ends of the second substrate 202 along the second direction D2). Each of the second light sources 220 may be a light source generating a short wavelength light. For example, each of the second light sources 220 may be a light emitting diode (LED) chip generating a blue light.

Each of the first light sources 210 is disposed between adjacent second light sources 220. Each of the first light sources 210 may be a light source generating a long wavelength light. For example, each of the first light sources 210 may be a light emitting diode (LED) chip generating a yellow light.

The light guiding plate 300 is disposed between the first light source part 100 and the second light source part 200. The light guiding plate 300 guides light (e.g., is configured to guide light) generated from the first light source part 100 and the second light source part 200 toward a display panel (e.g., the display panel will be further described in regard to FIG. 11).

The light guiding plate 300 includes a first incident surface 302, a second incident surface 304, an exiting surface 310, and a reflecting surface 320.

The first incident surface 302 faces the first light source part 100. The light generated from the first light source part 100 enters into the light guiding plate 300 through the first incident surface 302.

The second incident surface 304 is opposite to the first incident surface 302. The second incident surface 304 faces the second light source part 200. The light generated from the second light source part 200 enters into the light guiding plate 300 through the second incident surface 304.

The exiting surface 310 is adjacent to the first incident surface 302 and the second incident surface 304 and faces the display panel. The light which enters the light guiding plate 300 exits through the exiting surface 310. The exiting surface 310 includes a central portion 312 and first and second peripheral portions 314 and 316 which are adjacent to the central portion 312 and disposed at respective ends of the exiting surface 310 along the second direction D2.

A light exiting pattern may be formed at or on the exiting surface 310. The light exiting pattern evenly distributes the light exiting through the light guiding plate 300. For example, the light exiting pattern may include a plurality of fine dots including titanium dioxide (e.g., $TiO_2$) and resin and be formed on the exiting surface 310. In addition, the light exiting pattern may include a plurality of engraved patterns on the exiting surface 310.

The first peripheral portion 314 is disposed corresponding to (e.g., located to correspond to) the second light sources 120 and 220, which are disposed at first ends of the first and second light source parts 100 and 200 along the second direction D2, and extends in the first direction D1. Thus, the first peripheral portion 314 extends from the second light source 120 which is disposed at the first end of the first light source part 100 to the second light source 220 which is disposed at the first end of the second light source part 200.

A first absorbing pattern is formed at or on the first peripheral portion 314. The first absorbing pattern absorbs (e.g., partially absorbs) the short wavelength light emitted by the second light sources 120 and 220. For example, the first absorbing pattern may include a plurality of fine dots including ink configured to absorb the blue light and be formed at or on the first peripheral portion 314.

Thus, although the short wavelength light, which is emitted by the second light sources 120 and 220 disposed at the first ends of the first and second light source parts 100 and 200, may not sufficiently mix (e.g., be sufficiently mixed or interact) with the long wavelength light emitted by the first light sources 110 and 210 at a portion of the light guiding plate 300 corresponding to the first peripheral portion 314, the short wavelength light may be absorbed (e.g., partially absorbed) by the first absorbing pattern so that blue line stain, which is visible to a user, may be reduced at the first peripheral portion 314. Thus, although a brightness corresponding to a position of the first peripheral portion 314 is slightly reduced, the user may not realize or recognize the brightness reduction because of lesser sensitivity to the long wavelength light, so that display quality degradation may be reduced or minimized.

The second peripheral portion 316 is disposed corresponding to the second light sources 120 and 220, which are disposed at second ends of the first and second light source parts 100 and 200, the second ends being opposite to the first ends, and extends in the first direction D1. Thus, the second peripheral portion 316 extends from the second light source 120 which is disposed at the second end of the first light source part 100 to the second light source 220 which is disposed at the second end of the second light source part 200.

A second absorbing pattern is formed at or on the second peripheral portion 316. The second absorbing pattern absorbs (e.g., partially absorbs) the short wavelength light from the second light sources 120 and 220. For example, the second absorbing pattern may include a plurality of fine dots including ink absorbing (e.g., configured to absorb) the blue light and formed at or on the second peripheral portion 316.

Thus, although the short wavelength light, which is emitted by the second light sources 120 and 220 disposed at the second ends of the first and second light source parts 100 and 200, may not sufficiently mix (e.g., be sufficiently mixed or interact) with the long wavelength light from the first light sources 110 and 210 at a portion of the light guiding plate 300 corresponding to the second peripheral portion 316, the short wavelength light may be absorbed by the second absorbing pattern, so that blue line stain which is visible to a user at the second peripheral portion 316 may be reduced.

Thus, although a brightness corresponding to the second peripheral portion 316 is slightly reduced, the user may not realize or recognize the brightness reduction because of lesser sensitivity to the long wavelength light, so that display quality degradation may be minimized.

In addition, the light exiting pattern is formed at or on the central portion 312.

The reflecting surface 320 is opposite to the exiting surface 310. A first phosphor pattern 352 is disposed adjacent to the first light source part 100 and on the reflecting surface 320. A second phosphor pattern 354 is disposed adjacent to the second light source part 200 and on the reflecting surface 320.

The first phosphor pattern 352 extends in the second direction D2. The first phosphor pattern 352 changes or varies a wavelength of light contacting (e.g., passing by) a portion of the reflecting surface 320 adjacent to the first light source part 100 among the short wavelength light emitted by the first light source part 100. The first phosphor pattern 352 may include, for example, a yellow phosphor. For example, the yellow phosphor may include a YAG:Ce ($Y_3Al_5O_{12}$:Ce) phosphor such as a yttrium aluminum garnet doped with cerium or a silicate yellow phosphor having a dominant wavelength of about 530 nm to about 570 nm.

Accordingly, when a portion of the blue light generated by the first light source part 100 contacts the reflecting surface 320, is reflected, exits or passes through the exiting surface 310, and then reaches the user's eye, the portion of the blue light passes through or contacting the yellow phosphor is turned or changed into a white light, so that blue light stains may be reduced. Thus, light leakage and hot spot having a blue color may be changed into a white color by the yellow phosphor, so that quality of exiting light may be improved.

The second phosphor pattern 354 extends in the second direction D2. The second phosphor pattern 354 changes or varies wavelength of light contacting or passing through a portion of the reflecting surface 320 adjacent to the second light source part 200 among the short wavelength light emitted by the second light source part 200. The second phosphor pattern 354 may include, for example, a yellow phosphor. For example, the yellow phosphor may include a YAG:Ce (e.g., $Y_3Al_5O_{12}$:Ce) phosphor such as a yttrium aluminum garnet doped with cerium or a silicate yellow phosphor having a dominant wavelength of about 530 nm to about 570 nm.

Accordingly, when a portion of the blue light generated by the second light source part 200 contacts the reflecting surface 320, is reflected, exits or passes through the exiting surface 310, and then reaches the user's eye, the portion of the blue light that contacts or passes through the yellow phosphor is turned or changed into a white light, so that blue light stains may be reduced. Thus, light leakage and hot spot having a blue color may be changed into a white color by the yellow phosphor, so that quality of exiting light may be improved.

Figure 4:
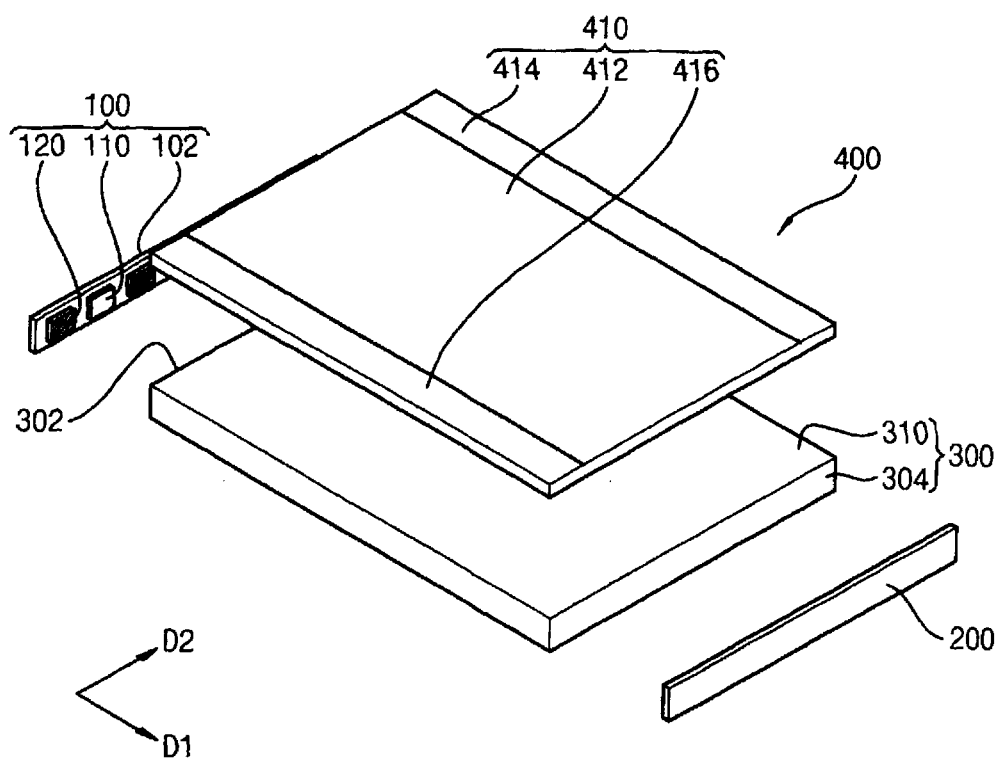
FIGS. 4 and 5 are exploded perspective views illustrating a backlight assembly according to another example embodiment of the invention.
Figure 5:
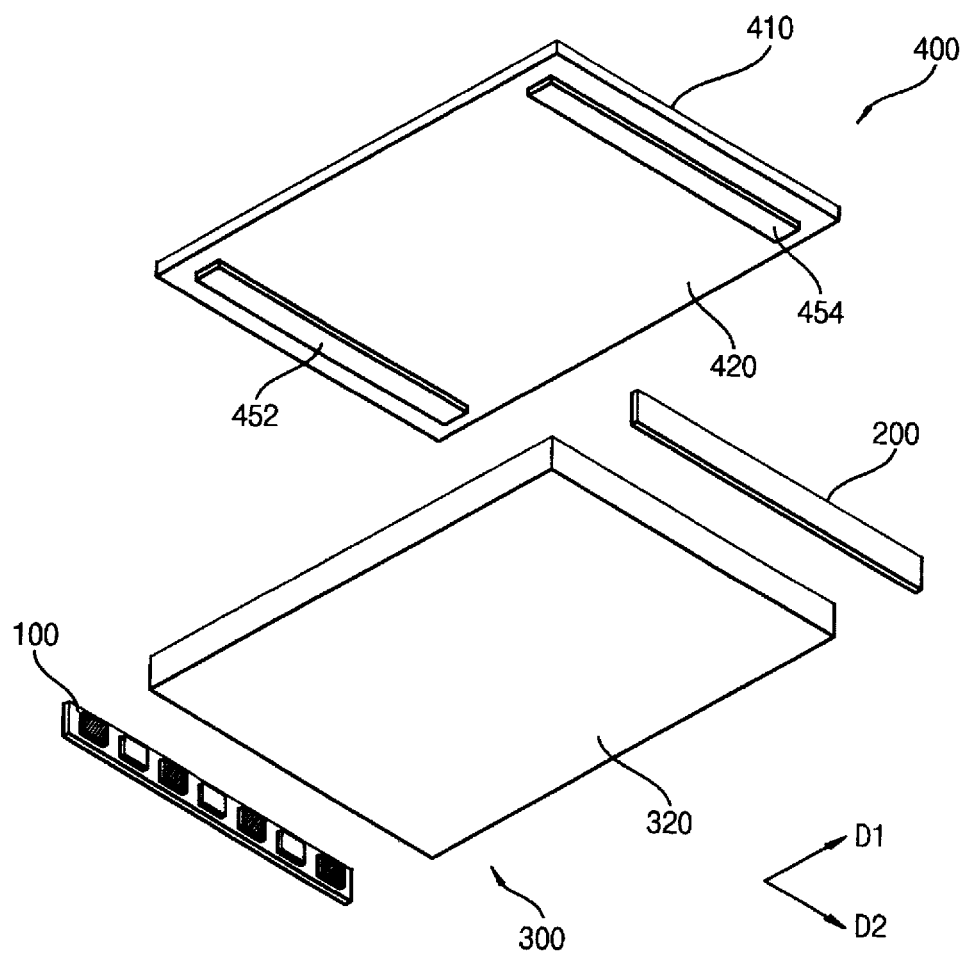

FIGS. 4 and 5 are exploded perspective views illustrating a backlight assembly according to another example embodiment of the invention.

Referring to FIGS. 4 and 5, a backlight assembly includes a first light source part 100, a second light source part 200, a light guiding plate 300, and a first sheet 400. The first light source part 100 and the second light source part 200 are substantially similar to or the same as the first and second light source parts of the backlight assembly shown in FIG. 1. Thus, any further detailed descriptions concerning repeated elements will be omitted.

The first light source part 100 includes a first substrate 102, a plurality of first light sources 110, and a plurality of second light sources 120. The first substrate 102 includes a driving circuit to drive the first and second light sources 110 and 120. The first light sources 110 and the second light sources 120 are alternately disposed along a second direction D2 on the first substrate 102. Each of the first light sources 110 emits light having a mixed color including a first primary color and a second primary color. Each of the second light sources 120 emits light having a third primary color.

The second light sources 120 are disposed at both ends of the first substrate 102 (e.g., both ends of the first substrate 102 along the second direction D2). Each of the second light sources 120 may be a light source generating a short wavelength light. For example, each of the second light sources 120 may be a light emitting diode (LED) chip generating a blue light.

Each of the first light sources 110 is disposed between adjacent second light sources 120. Each of the first light sources 110 may be a light source generating a long wavelength light. For example, each of the first light sources 110 may be a light emitting diode (LED) chip generating a yellow light.

The second light source part 200 is spaced from (e.g., spaced apart from) the first light source part 100 in the first direction D1 and faces the first light source part 100. The second light source part 200 includes a second substrate 202, a plurality of first light sources 210, and a plurality of second light sources 220.

The second substrate 202 includes a driving circuit to drive the first and second light sources 210 and 220. The first light sources 210 and the second light sources 220 are alternately disposed along the second direction D2 on the second substrate 202. Each of the first light sources 210 emits light having a mixed color including a first primary color and a second primary color. Each of the second light sources 220 emits light having a third primary color.

The second light sources 220 are disposed at both ends of the second substrate 202 (e.g., both ends of the second substrate 202 along the second direction D2). Each of the second light sources 220 may be a light source generating a short wavelength light. For example, each of the second light sources 220 may be a light emitting diode (LED) chip generating a blue light.

Each of the first light sources 210 is disposed between adjacent second light sources 220. Each of the first light sources 210 may be a light source generating a long wavelength light. For example, each of the first light sources 210 may be a light emitting diode (LED) chip generating a yellow light.

The light guiding plate 300 is disposed between the first light source part 100 and the second light source part 200 (e.g., between the first and second light source parts 100 and 200 along the first direction D1). The light guiding plate 300 guides light generated by the first light source part 100 and the second light source part 200 toward a display panel (e.g., a display panel 20 of FIG. 11).

The light guiding plate 300 includes a first incident surface 302, a second incident surface 304, an exiting surface 310, and a reflecting surface 320.

The first incident surface 302 faces the first light source part 100. The light generated by the first light source part 100 enters into the light guiding plate 300 through the first incident surface 302.

The second incident surface 304 is opposite to the first incident surface 302. The second incident surface 304 faces the second light source part 200. The light generated by the second light source part 200 enters into the light guiding plate 300 through the second incident surface 304.

The exiting surface 310 is adjacent to the first incident surface 302 and the second incident surface 304 and faces a lower surface 420 of the first sheet 400. The light which enters through the light guiding plate 300 exits or passes through the exiting surface 310.

A light exiting pattern may be formed at or on the exiting surface 310. The light exiting pattern evenly or uniformly distributes the light exiting through the light guiding plate 300. For example, the light exiting pattern may include a plurality of fine dots including titanium dioxide (e.g., $TiO_2$) and resin and be formed at or on the exiting surface 310. In addition, the light exiting pattern may include a plurality of engraved patterns on the exiting surface 310.

The first sheet 400 is disposed on the light guiding plate 300. The first sheet 400 includes an upper surface 410 facing the display panel and the lower surface 420 opposite to the upper surface 410 and facing the exiting surface 310 of the light guiding plate 300.

The upper surface 410 includes a central portion 412 and first and second peripheral portions 414 and 416 which are adjacent to the central portion 412 and disposed at both ends of the upper surface 410 in the second direction D2

The first peripheral portion 414 corresponds to the first and second light sources 120 and 220, which are disposed at first ends of the first and second light source parts 100 and 200, and extends in the first direction D1. Thus, the first peripheral portion 414 extends from the second light source 120 at the first end of the first light source part 100 to the second light source 220 at the first end of the second light source part 200.

A first absorbing pattern is formed at or on the first peripheral portion 414. The first absorbing pattern absorbs (e.g., partially absorbs) the short wavelength light emitted by the second light sources 120 and 220. For example, the first absorbing pattern may include a plurality of fine dots including ink absorbing the blue light and be formed at or on the first peripheral portion 414.

Thus, although the short wavelength light, which is emitted by the second light sources 120 and 220 disposed at the first ends of the first and second light source parts 100 and 200, may not sufficiently mix (e.g., be sufficiently mixed or interact) with the long wavelength light from the first light sources 110 and 210 at a portion of the light guiding plate 300 corresponding to the first peripheral portion 414, the short wavelength light may be absorbed by the first absorbing pattern, so that blue line stain which is visible to a user at the first peripheral portion 414 may be reduced. Thus, although a brightness corresponding to the first peripheral portion 414 is slightly reduced, the user may not realize or recognize the brightness reduction because of lesser sensitivity to the long wavelength light, so that display quality degradation may be reduced or minimized.

The second peripheral portion 416 is disposed corresponding to the second light sources 120 and 220, which are disposed at second ends of the first and second light source parts 100 and 200, opposite to the first ends thereof, and extends in the first direction D1. Thus, the second peripheral portion 416 extends from the second light source 120 which is disposed at the second end of the first light source part 100 to the second light source 220 which is disposed at the second end of the second light source part 200.

A second absorbing pattern is formed at or on the second peripheral portion 416. The second absorbing pattern absorbs (e.g., partially absorbs) the short wavelength light emitted by the second light sources 120 and 220. For example, the second absorbing pattern may include a plurality of fine dots including ink absorbing the blue light and be formed at or on the second peripheral portion 416.

Thus, although the short wavelength light, which is emitted by the second light sources 120 and 220 disposed at the second ends of the first and second light source parts 100 and 200, may not sufficiently mix (e.g., be sufficiently mixed or interact) with the long wavelength light emitted by the first light source 110 and 210 at a portion of the light guiding plate 300 corresponding to the second peripheral portion 416, the short wavelength light may be absorbed by the second absorbing pattern, so that blue line stain which is visible to a user at the second peripheral portion 416 may be reduced. Thus, although a brightness corresponding to the second peripheral portion 416 is slightly reduced, the user may not realize or recognize the brightness reduction because of lesser sensitivity to the long wavelength light, so that display quality degradation may be reduced or minimized.

A first phosphor pattern 452 is disposed adjacent to the first light source part 100 and on the lower surface 420. A second phosphor pattern 454 is disposed adjacent to the second light source part 200 and on the lower surface 420.

The first phosphor pattern 452 and the second phosphor pattern 454 are substantially similar to or the same as the first and second phosphor patterns shown in FIG. 3, except for positions of the first and second phosphor pattern 452 and 454. Thus, any further detailed descriptions concerning repeated elements may be briefly described or omitted.

The first phosphor pattern 452 extends in the second direction D2. The first phosphor pattern 452 changes or varies wavelength of light exiting or passing through a portion of the exiting surface 310 adjacent to the first light source part 100 among the short wavelength light emitted by the first light source part 100. The first phosphor pattern 452 may include, for example, a yellow phosphor.

Accordingly, when a portion of the blue light generated by the first light source part 100 exits or passes through the light exiting surface 310, and then reaches the user's eye, the portion of the blue light that passes through or by the yellow phosphor is turned or changed into a white light, so that blue light stains may be reduced. Thus, light leakage and hot spot having a blue color may be turned or changed into a white color by the yellow phosphor, so that quality of exiting light may be improved.

The second phosphor pattern 454 extends in the second direction D2. The second phosphor pattern 454 changes or varies wavelength of light exiting or passing through a portion of the exiting surface 310 adjacent to the second light source part 200 among the short wavelength light emitted by the second light source part 200. The second phosphor pattern 454 may include, for example, a yellow phosphor.

Accordingly, when a portion of the blue light generated by the second light source part 200 exits or passes through the light exiting surface 310, and then reaches the user's eye, the portion of the blue light that passes by or through the yellow phosphor is turned or changed into a white light, so that blue light stains may be reduced. Thus, light leakage and hot spot having a blue color may be turned or changed into a white color by the yellow phosphor, so that quality of exiting light may be improved.

According to the present example embodiment, by adding the first sheet 400 to a light guiding plate and a light source part, quality of exiting light may be improved.

Figure 6:
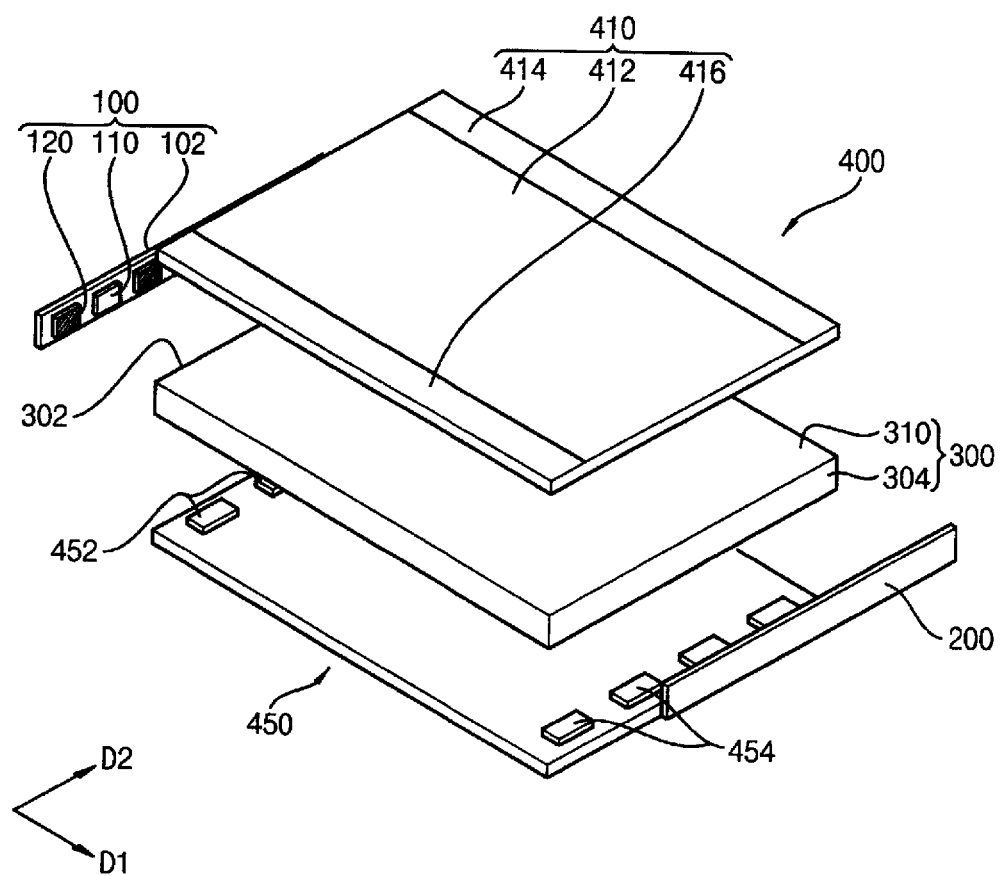
FIG. 6 is an exploded perspective view illustrating a backlight assembly according to still another example embodiment of the invention.
Figure 7:
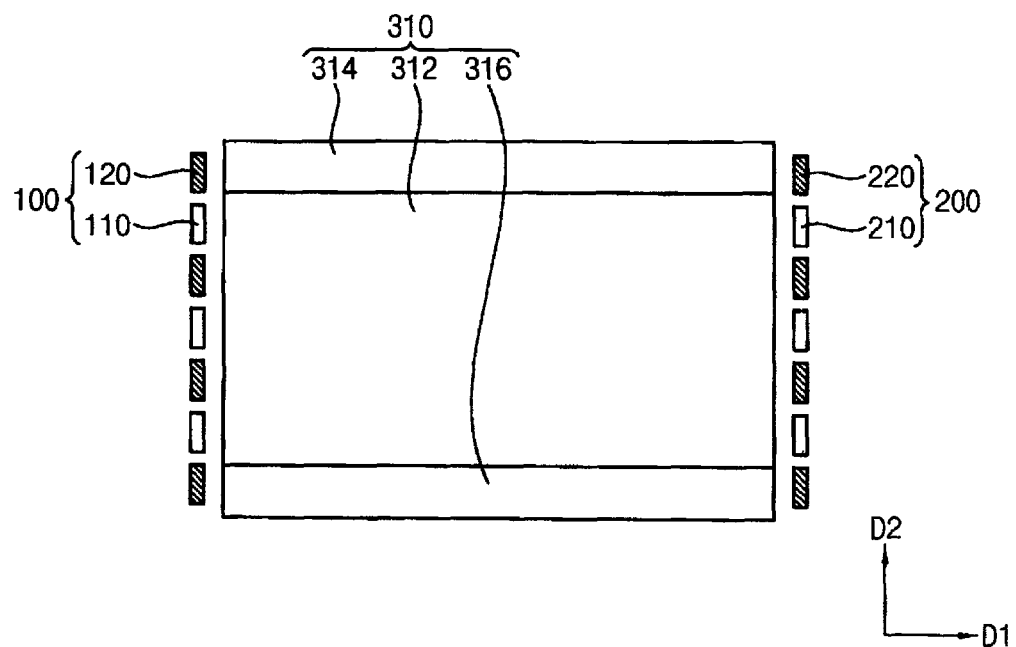
FIG. 7 is a plan view illustrating a first sheet of the backlight assembly shown in FIG. 6.
Figure 8:
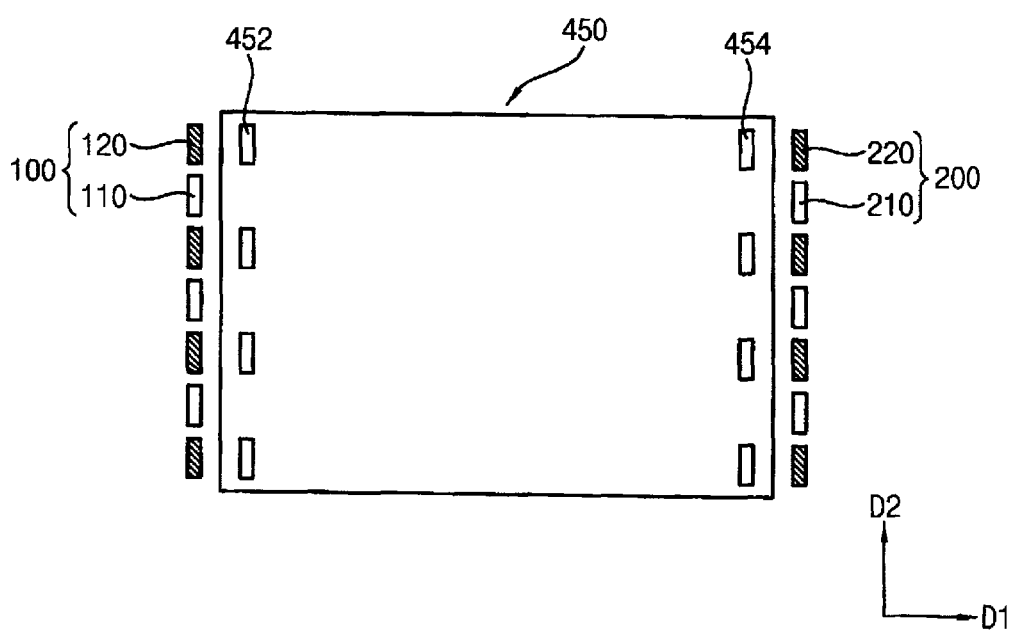
FIG. 8 is a plan view illustrating a second sheet of the backlight assembly shown in FIG. 6.

FIG. 6 is an exploded perspective view illustrating a backlight assembly according to still another example embodiment of the invention. FIG. 7 is a plan view illustrating a first sheet of the backlight assembly shown in FIG. 6. FIG. 8 is a plan view illustrating a second sheet of the backlight assembly shown in FIG. 6.

Referring to FIGS. 6 to 8, a backlight assembly includes a first light source part 100, a second light source part 200, a light guiding plate 300, a first sheet 400, and a second sheet 450. The first light source part 100, the second light source part 200, and the light guiding plate 300 are substantially similar to or the same as the first light source part, the second light source part, and the light guiding plate shown in FIG. 4. Thus, any further detailed descriptions concerning repeated elements may be briefly described or omitted.

The first light source part 100 includes a first substrate 102, a plurality of first light sources 110, and a plurality of second light sources 120. The first substrate 102 includes a driving circuit to drive the first and second light sources 110 and 120. The first light sources 110 and the second light sources 120 are alternately disposed along a second direction D2 on the first substrate 102. The first light sources 110 emit light having a mixed color including a first primary color and a second primary color. The second light sources 120 emit light having a third primary color.

The second light sources 120 are disposed at both ends of the first substrate 102 (e.g., both ends of the first substrate 102 along the second direction D2). Each of the second light sources 120 may be a light source generating a short wavelength light. For example, each of the second light sources 120 may be a light emitting diode (LED) chip generating a blue light.

Each of the first light sources 110 is disposed between adjacent second light sources 120. Each of the first light sources 110 may be a light source generating a long wavelength light. For example, each of the first light sources 110 may be a light emitting diode (LED) chip generating a yellow light.

The second light source part 200 is spaced from (e.g., spaced apart from) the first light source part 100 in the first direction D1 and faces the first light source part 100. The second light source part 200 includes a second substrate 202, a plurality of first light sources 210, and a plurality of second light sources 220.

The second substrate 202 includes a driving circuit to drive the first and second light sources 210 and 220. The first light sources 210 and the second light sources 220 are alternately disposed along the second direction D2 on the second substrate 202. The first light sources 210 emit light having a mixed color including the first primary color and the second primary color. The second light source 220 emits light having the third primary color.

The second light sources 220 are disposed at both ends of the second substrate 202 (e.g., both ends of the second substrate along the second direction D2). Each of the second light sources 220 may be a light source generating a short wavelength light. For example, each of the second light sources 220 may be a light emitting diode (LED) chip generating a blue light.

Each of the first light sources 210 is disposed between adjacent second light sources 220. Each of the first light sources 210 may be a light source generating a long wavelength light. For example, each of the first light source 210 may be a light emitting diode (LED) chip generating a yellow light.

The light guiding plate 300 is disposed between the first light source part 100 and the second light source part 200.

Figure 11:
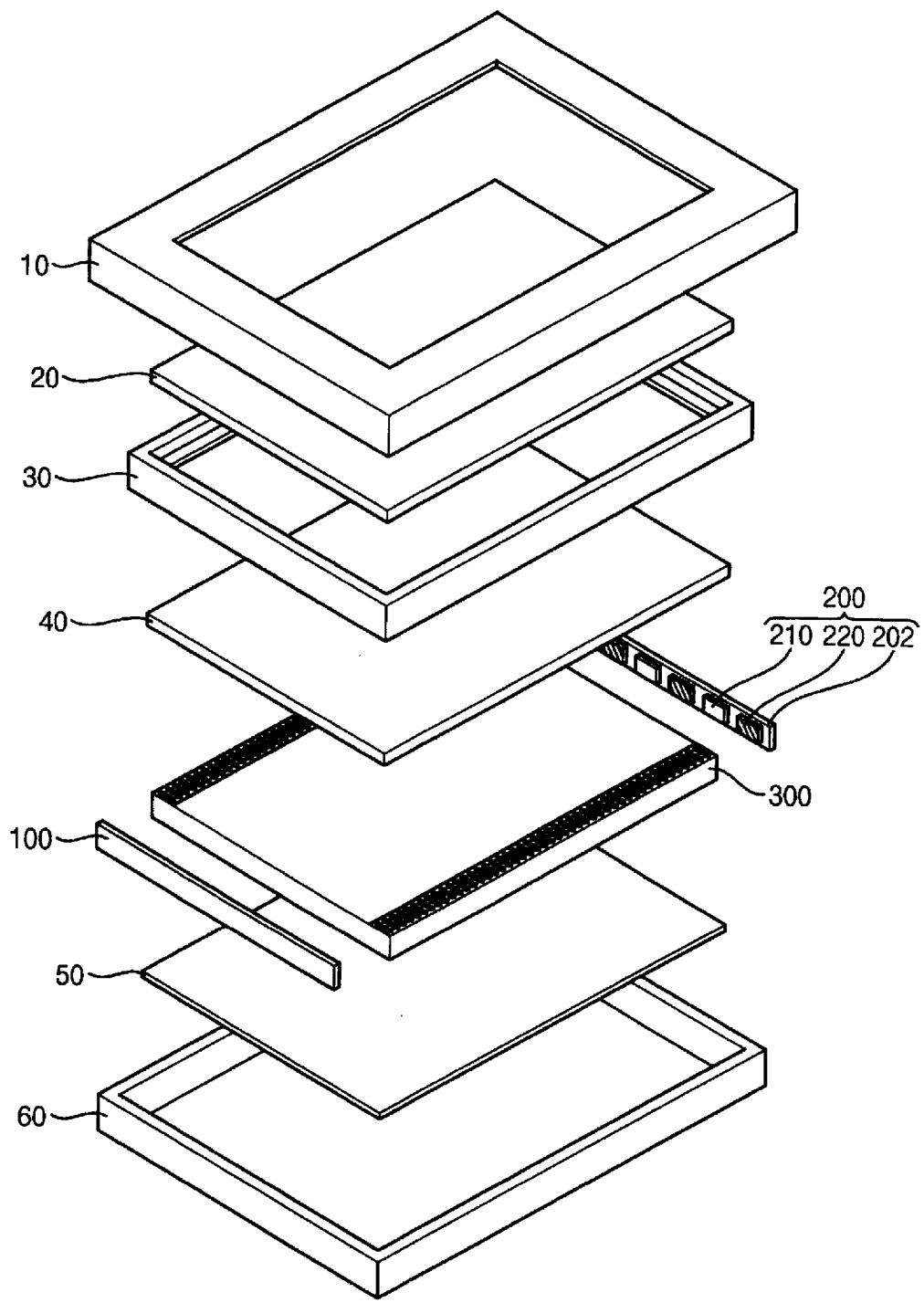
FIG. 11 is an exploded perspective view illustrating a display apparatus according to an example embodiment of the invention.

The light guiding plate 300 guides light generated by the first light source part 100 and the second light source part 200 to a display panel (refer to 20 of FIG. 11).

The light guiding plate 300 includes a first incident surface 302, a second incident surface 304, an exiting surface 310, and a reflecting surface 320.

The first incident surface 302 faces the first light source part 100. The light generated by the first light source part 100 enters into the light guiding plate 300 through the first incident surface 302.

The second incident surface 304 is opposite to the first incident surface 302. The second incident surface 304 faces the second light source part 200. The light generated by the second light source part 200 enters into the light guiding plate 300 through the second incident surface 304.

The exiting surface 310 is adjacent to the first incident surface 302 and the second incident surface 304 and faces a lower surface 420 of the first sheet 400. The light which enters the light guiding plate 300 exits or passes through the exiting surface 310.

A light exiting pattern may be formed at or on the exiting surface 310. The light exiting pattern evenly or uniformly distributes the light exiting through the light guiding plate 300. For example, the light exiting pattern may include a plurality of fine dots including titanium dioxide (e.g., $TiO_2$) and resin and be formed at or on the exiting surface 310. In addition, the light exiting pattern may be a plurality of engraved patterns on the exiting surface 310.

The first sheet 400 is disposed on the light guiding plate 300. The first sheet 400 includes an upper surface 410 which faces the display panel.

The upper surface 410 includes a central portion 412 and first and second peripheral portions 414 and 416 which are adjacent to the central portion 412 and disposed at respective ends of the upper surface 410 along the second direction D2

The first peripheral portion 414 corresponds to the first and second light sources 120 and 220, which are disposed at first ends of the first and second light source parts 100 and 200, and extends in the first direction D1. Thus, the first peripheral portion 414 extends from the second light source 120 at the first end of the first light source part 100 to the second light source 220 at the first end of the second light source part 200.

A first absorbing pattern is formed at or on the first peripheral portion 414. The first absorbing pattern absorbs (e.g., partially absorbs) the short wavelength light emitted by the second light source 120 and 220. For example, the first absorbing pattern may include a plurality of fine dots including ink absorbing the blue light and be formed at or on the first peripheral portion 414.

The second peripheral portion 416 is disposed corresponding to the second light sources 120 and 220 which are disposed at second ends of the first and second light source parts 100 and 200, are opposite to the first ends, and extends in the first direction D1. Thus, the second peripheral portion 416 extends from the second light source 120, which is disposed at the second end of the first light source part 100, to the second light source 220, which is disposed at the second end of the second light source part 200.

A second absorbing pattern is formed at or on the second peripheral portion 416. The second absorbing pattern absorbs (e.g., partially absorbs) the short wavelength light emitted by the second light sources 120 and 220. For example, the second absorbing pattern may include a plurality of fine dots including ink absorbing the blue light and be formed at or on the second peripheral portion 416.

The second sheet 450 is disposed under the light guiding plate 300. The second sheet 450 includes an upper surface which faces the light guiding plate 300.

A first phosphor pattern 452 is disposed adjacent to the first light source part 100 and on the upper surface of the second sheet 450 (e.g., the first phosphor pattern 452 is disposed to correspond to the first light source 110). A second phosphor pattern 454 is disposed adjacent to the second light source part 200 and on the upper surface of the second sheet 450 (e.g., the second phosphor pattern 454 is disposed to correspond to the first light source 210).

The first phosphor pattern 452 extends in the second direction D2. The first phosphor pattern 452 changes or varies wavelength of light contacting (e.g., exiting or passing through) a portion of the reflecting surface 320 adjacent to the first light source part 100 among the short wavelength light emitted by the first light source part 100. The first phosphor pattern 452 may include a yellow phosphor.

The second phosphor pattern 454 extends in the second direction D2. The second phosphor pattern 454 changes or varies wavelength of light contacting (e.g., exiting or passing through) a portion of the reflecting surface 320 adjacent to the second light source part 200 among the short wavelength light emitted by the second light source part 200. The second phosphor pattern 454 may include a yellow phosphor.

The upper surface 410 of the first sheet 400 is substantially similar to or the same as the upper surface of the first sheet shown in FIG. 4. In addition, the first and second phosphor patterns 452 and 454 are substantially similar to or the same as the first and second phosphor patterns shown in FIG. 5, except for positions of the first and second phosphor patterns 452 and 454.

Figure 9:
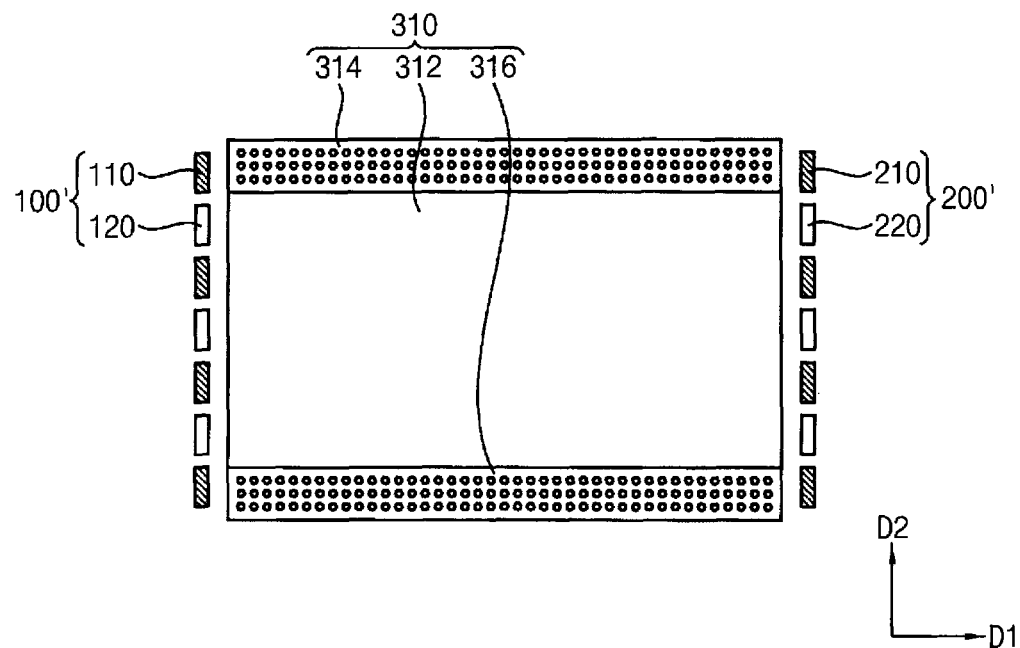
FIG. 9 is a plan view illustrating a backlight assembly according to still another example embodiment of the invention.

FIG. 9 is a plan view illustrating a backlight assembly according to still another example embodiment of the invention.

Referring to FIG. 9, the backlight assembly is substantially similar to or the same as the backlight assembly shown in FIG. 1, except for an upper surface of the light guiding plate and arrangement of first and second light sources. Thus, any further detailed descriptions concerning repeated elements may be briefly described or omitted.

The backlight assembly includes a first light source part 100', a second light source part 200', and a light guiding plate.

The first light source part 100' includes a first substrate, a plurality of first light sources 110, and a plurality of second light sources 120.

The first light sources 110 and the second light sources 120 are alternately disposed along a second direction D2 on the first substrate.

The first light sources 110 emit light having a mixed color including a first primary color and a second primary color. The second light sources 120 emit light having a third primary color.

The first light sources 110 are disposed at both ends of the first substrate 102 (e.g., both ends of the first substrate along the second direction D2). Each of the first light sources 110 may be a light source generating a long wavelength light. For example, each of the first light sources 110 may be a light emitting diode (LED) chip generating a yellow light.

Each of the second light sources 120 is disposed between adjacent first light sources 110. Each of the second light sources 120 may be a light source generating a short wavelength light. For example, each of the second light sources 120 may be a light emitting diode (LED) chip generating a blue light.

The second light source part 200' is spaced from (e.g., spaced apart from) the first light source part 100' in the first direction D1 and faces the first light source part 100'. The second light source part 200' includes a second substrate, a plurality of first light sources 210, and a plurality of second light sources 220.

The first light sources 210 and the second light sources 220 are alternately disposed along the second direction D2 on the second substrate.

The first light sources 210 emit light having a mixed color including the first primary color and the second primary color. The second light sources 220 emit light having the third primary color.

The first light sources 210 are disposed at both ends of the second substrate (e.g., both ends of the second substrate along the second direction D2). Each of the first light sources 210 may be a light source generating a long wavelength light. For example, each of the first light sources 210 may be a light emitting diode (LED) chip generating a yellow light.

Each of the second light sources 220 is disposed between adjacent first light sources 210. Each of the second light sources 220 may be a light source generating a short wavelength light. For example, each of the second light sources 220 may be a light emitting diode (LED) chip generating a blue light.

The light guiding plate is disposed between the first light source part 100' and the second light source part 200'. The light guiding plate guides light generated by the first light source part 100' and the second light source part 200' to a display panel. The light guiding plate includes a first incident surface, a second incident surface, an exiting surface 310, and a reflecting surface.

The exiting surface 310 includes a central portion 312 and first and second peripheral portions 314 and 316 which are adjacent to the central portion 312 and disposed at both ends of the exiting surface 310 in the second direction D2.

A light exiting pattern may be formed at or on the exiting surface 310. The light exiting pattern evenly or uniformly distributes the light exiting through the light guiding plate. For example, the light exiting pattern may include a plurality of fine dots including titanium dioxide (e.g., $TiO_2$) and resin and be formed at or on the exiting surface 310. In addition, the light exiting pattern may be a plurality of engraved patterns on the exiting surface 310.

The first peripheral portion 314 is disposed corresponding to the first light sources 110 and 210 which are disposed at first ends of the first and second light source parts 100' and 200', and extends in the first direction D1. Thus, the first peripheral portion 314 extends from the first light source 110, which is disposed at the first end of the first light source part 100', to the first light source 210, which is disposed at the first end of the second light source part 200'.

A first absorbing pattern is formed at or on the first peripheral portion 314. The first absorbing pattern absorbs (e.g., partially absorbs) the long wavelength light from the first light sources 110 and 210. For example, the first absorbing pattern may include a plurality of fine dots including ink absorbing the blue light and be formed at or on the first peripheral portion 314.

Thus, although the short wavelength light, which is emitted by the second light sources 120 and 220 may not sufficiently mix (e.g., be sufficiently mixed or interact) with the long wavelength light emitted by the first light sources 110 and 210 at a portion of the light guiding plate 300 corresponding to the first peripheral portion 314, the long wavelength light may be absorbed by the first absorbing pattern, so that yellow line stain which is visible to a user at the first peripheral portion 314 may be reduced.

The second peripheral portion 316 is disposed corresponding to the first light sources 110 and 210, which are disposed at second ends of the first and second light source parts 100' and 200' which is opposite to the first ends, and extends in the first direction D1. Thus, the second peripheral portion 316 extends from the first light sources 110, which is disposed at the second end of the first light source part 100', to the first light sources 210, which is disposed at the second end of the second light source part 200'.

A second absorbing pattern is formed at or on the second peripheral portion 316. The second absorbing pattern absorbs (e.g., partially absorbs) the long wavelength light emitted by the first light sources 110 and 210. For example, the second absorbing pattern may include a plurality of fine dots including ink absorbing the yellow light and be formed at or on the second peripheral portion 316.

Thus, although the long wavelength light, which is emitted by the first light sources 110 and 210 disposed at the second ends of the first and second light source parts 100' and 200', may not sufficiently mix (e.g., be sufficiently mixed or interact) with the long wavelength light from the first light sources 110 and 210 at a portion of the light guiding plate corresponding to the second peripheral portion 316, the long wavelength light may be absorbed by the second absorbing pattern, so that yellow line stain which is visible to a user at the second peripheral portion 316 may be reduced.

In addition, the light exiting pattern is formed on the central portion 312.

Although the first light sources 110 and 210 which generate a long wavelength light are disposed at the both ends of the first and second light source parts 100' and 200', light sources generating light having a desired wavelength (e.g., a proper wavelength) may be disposed at both ends of the first and second light source parts 100' and 200'. Accordingly, the kind of ink included in the first and second absorbing patterns may be determined accordingly. Thus, an ink absorbing a desired wavelength (e.g., a proper wavelength) may be formed corresponding to the first and second peripheral areas 314 and 316 according to a light source arrangement.

Figure 10:
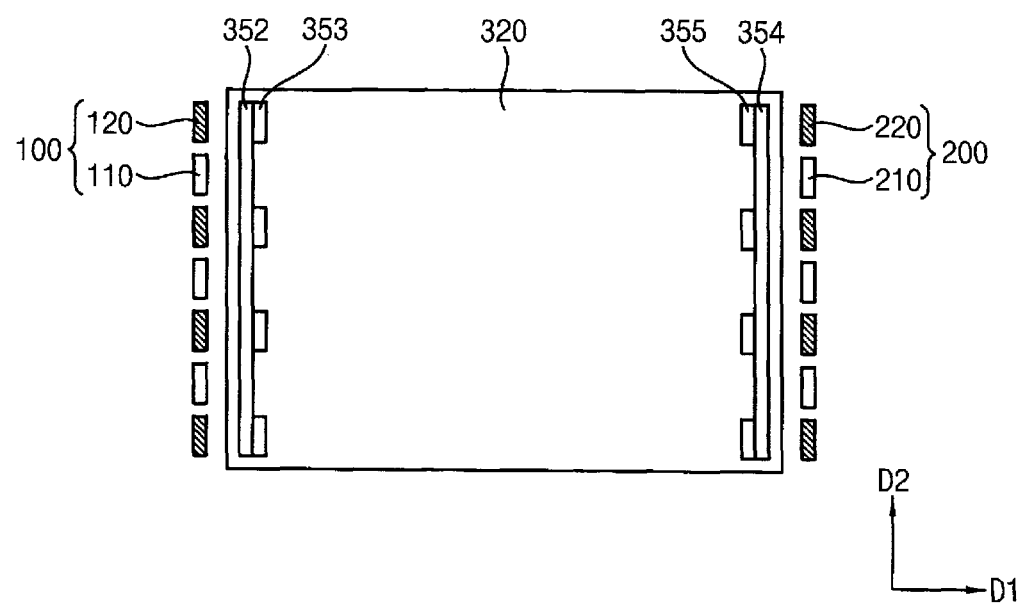
FIG. 10 is a bottom view illustrating a backlight assembly according to still another example embodiment of the invention.

FIG. 10 is a bottom view illustrating a backlight assembly according to still another example embodiment of the invention.

Referring to FIG. 10, the backlight assembly is substantially similar to or the same as the backlight assembly shown in FIG. 1, except for first and second sub-phosphor patterns. Thus, any further detailed descriptions concerning repeated elements may be briefly described or omitted.

The backlight assembly includes a first light source part 100, a second light source part 200, and a light guiding plate.

The first light source part 100 includes a first substrate, a plurality of first light sources 110, and a plurality of second light sources 120. The first light sources 110 and the second light sources 120 are alternately disposed along a second direction D2 on the first substrate.

The second light source part 200 is spaced from (e.g., spaced apart from) the first light source part 100 in the first direction D1 and faces the first light source part 100. The second light source part 200 includes a second substrate, a plurality of first light sources 210, and a plurality of second light sources 220. The first light sources 210 and the second light sources 220 are alternately disposed along the second direction D2 on the second substrate.

The light guiding plate is disposed between the first light source part 100 and the second light source part 200. The light guiding plate guides light generated by the first light source part 100 and the second light source part 200 to a display panel. The light guiding plate includes a first incident surface, a second incident surface, an exiting surface, and a reflecting surface 320.

A first phosphor pattern 352 is disposed adjacent to the first light source part 100 and on the reflecting surface 320. A second phosphor pattern 354 is disposed adjacent to the second light source part 200 and on the reflecting surface 320.

The first phosphor pattern 352 extends in the second direction D2. The first phosphor pattern 352 changes or varies wavelength of light contacting (e.g., exiting or passing through) a portion of the reflecting surface 320 adjacent to the first light source part 100 among the short wavelength light emitted by the first light source part 100. The first phosphor pattern 352 may include a yellow phosphor.

The second phosphor pattern 354 extends in the second direction D2. The second phosphor pattern 354 changes or varies wavelength of light contacting (e.g., exiting or passing through) a portion of the reflecting surface 320 adjacent to the second light source part 200 among the short wavelength light emitted by the second light source part 200. The second phosphor pattern 354 may include a yellow phosphor.

A first sub-phosphor pattern 353 may be disposed adjacent to the first phosphor pattern 352 on the reflecting surface 320. The first sub-phosphor pattern 353 may be disposed corresponding to the second light sources 120 of the first light source part 100 which generate the short wavelength light. The first sub-phosphor pattern 353 may include a material similar to or the same as the first phosphor pattern 352.

A second sub-phosphor pattern 355 may be disposed adjacent to the second phosphor pattern 354 on the reflecting surface 320. The second sub-phosphor pattern 355 may be disposed corresponding to the second light sources 220 of the second light source part 200 which generate the short wavelength light. The second sub-phosphor pattern 355 may include a material similar to or the same as the second phosphor pattern 355.

Accordingly, the first phosphor pattern 352, the first sub-phosphor pattern 353, second phosphor pattern 354, and second sub-phosphor pattern 355 are disposed at the portion of the reflecting surface 320 adjacent to the second light sources 120 and 220 generating the short wavelength light. Thus, light leakage and hot spot which has a blue color may be changed into a white color by the yellow phosphor, so that quality of exiting light may be improved.

Although the first phosphor pattern 352, the first sub-phosphor pattern 353, second phosphor pattern 354, and second sub-phosphor pattern 355 are disposed on the reflecting surface 320 of the light guiding plate 300 in the present example embodiment, position and material of the phosphor patterns may be varied so that light leakage adjacent to light sources and light causing hot spot may be changed into white light.

Figure 12:
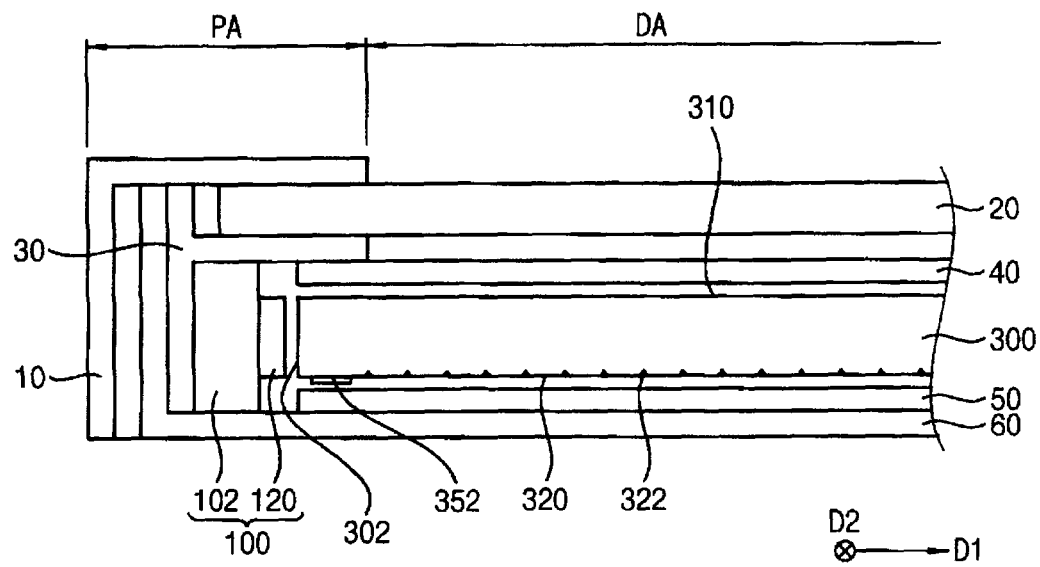
FIG. 12 is a cross-sectional view illustrating the display apparatus shown in FIG. 11.

FIG. 11 is an exploded perspective view illustrating a display apparatus according to an example embodiment of the invention. FIG. 12 is a cross-sectional view illustrating the display apparatus shown in FIG. 11.

Referring to FIGS. 11 and 12, a display apparatus includes a receiving container including a top chassis 10 and a bottom chassis 60, a display panel 20, a mold frame 30, optical elements 40, a first light source part 100, a second light source part 200, a light guiding plate 300, and a reflecting element 50. The first light source part 100, the second light source part 200, and the light guiding plate 300 are substantially similar to or the same as the first light source part, the second light source part, and the light guiding plate shown in FIG. 1. Thus, any further detailed descriptions concerning repeated elements may be briefly described or omitted.

The display panel 20 displays an image (e.g., is configured to display an image). The display panel 20 includes a first substrate, a second substrate, and a liquid crystal layer. The display panel 20 further includes a first sub-pixel having (e.g., displaying) a first primary color, a second sub-pixel having (e.g., for displaying) a second primary color, and a transparent sub-pixel. The display panel will be further described with reference to FIGS. 13A and 13B.

The mold frame 30 supports the display panel 20, the optical elements 40, the first light source part 100, the second light source part 200, the light guiding plate 300, and the reflecting element 50 to fix them in the receiving container. The mold frame 30 may include elastic material.

The light guiding plate 300 is disposed under the display panel 20. The light guiding plate 300 is substantially similar to or the same as the light guiding plate shown in FIG. 1. A reflecting pattern 322 may be formed at or on a reflecting surface 320 of the light guiding plate 300 (e.g., see FIG. 12). The reflecting pattern 322 may include a plurality of engraved patterns.

The first light source part 100 faces a first incident surface 302 of the light guiding plate 300. The first light source part 100 is substantially similar to or the same as the first light source part shown in FIG. 1.

The second light source part 200 faces a second incident surface of the light guiding plate 300. The second light source part 200 is substantially similar to or the same as the second light source part shown in FIG. 1.

The optical elements 40 are disposed between the display panel 20 and the light guiding plate 300. The optical elements 40 may improve optical properties of the light emitted from the light guiding plate 300. Thus, the optical element 40 may make brightness of the light emitted from the light guiding plate 300 substantially uniform. The optical element 40 may include a plurality of optical sheets. For example, optical element 40 may include a protecting sheet, a prism sheet, and a diffusion sheet. The diffusion sheet may be disposed on a light exiting surface of the light guiding plate 300. The prism sheet may be disposed on the diffusion sheet. The protecting sheet may be disposed on the prism sheet. The prism sheet may include an upper prism sheet and a lower prism sheet. An axis of the upper prism sheet may be substantially perpendicular to an axis of the lower prism sheet. However, many various suitable modifications of the optical sheet may be possible.

The reflecting element 50 is disposed under the light guiding plate 300. The reflecting element 50 faces the reflecting surface 320 of the light guiding plate 300. The reflecting element 50 reflects light from the reflecting surface 320 of the light guiding plate 300 toward the display panel 20. The reflecting element 50 may include a material having relatively high reflectivity.

The receiving container includes the top chassis 10 and the bottom chassis 60. The receiving container receives the display panel 20, the mold frame 30, the optical elements 40, the first light source part 100, the second light source part 200, the light guiding plate 300, and the reflecting element 50.

The display apparatus includes a display area DA on which an image is displayed and a peripheral area PA surrounding the display area DA which is a non-displaying area. The top chassis 10 may be formed corresponding to the peripheral area PA. A first phosphor pattern 352 (e.g., see FIG. 3) is disposed corresponding to the peripheral area PA, so that the first phosphor pattern 352 changes or varies wavelength of light which cause light leakage at a boundary of the peripheral area PA and the display area DA. Thus, specific color light leakage adjacent to the first incident surface 302 of the light guiding plate 300 may be reduced.

Figure 13A:
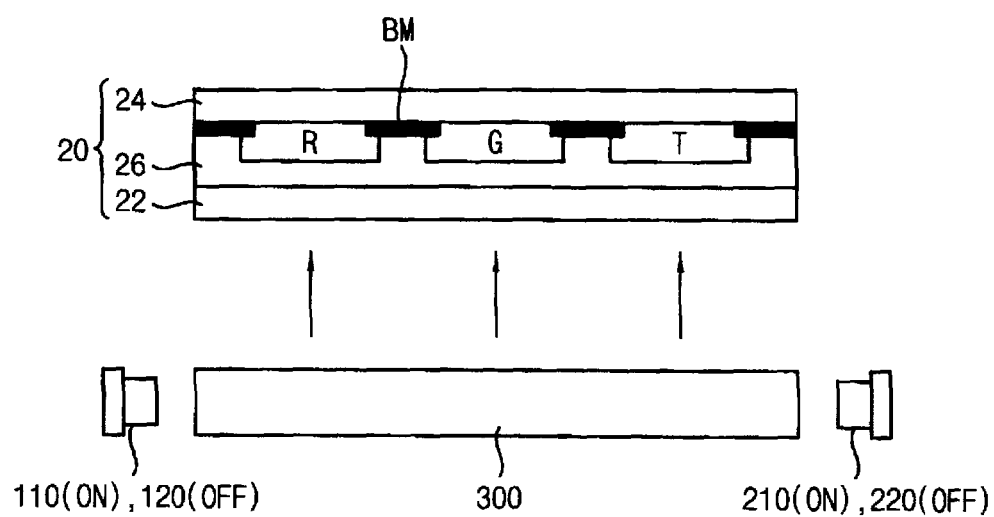
FIGS. 13A and 13B are cross-sectional views illustrating driving configurations of a display panel and a backlight assembly of the display apparatus shown in FIG. 11.
Figure 13B:
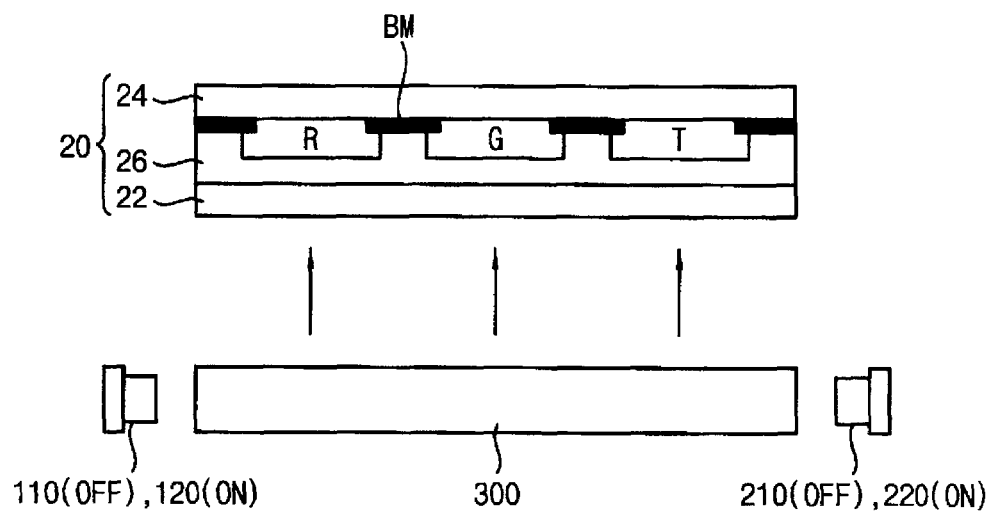

FIGS. 13A and 13B are cross-sectional views briefly illustrating a display panel and a backlight assembly of the display apparatus shown in FIG. 11 to explain driving of the display apparatus. More particularly, FIG. 13A is across-sectional view showing the display panel and the light source part 100 shown in FIG. 1 in a first subframe. FIG. 13B is a cross-sectional view showing the display panel and the light source part shown in FIG. 1 in a second subframe.

Referring to FIGS. 13A and 13B, the display apparatus includes the display panel 20, the first light source part including the first and second light sources 110 and 120, the second light source part including the first and second light sources 210 and 220, the light guiding plate 300, and a panel driver and a light source driver.

The display panel 20 displays an image (e.g., is configured to display an image). The display panel 20 includes a first substrate 22, a second substrate 24, and a liquid crystal layer 26.

The display panel 20 further includes a first subpixel R having (e.g., displaying) a first primary color, a second subpixel G having (e.g., displaying) a second primary color, and a transparent subpixel T.

In the present example embodiment, the first primary color is red. Thus, the first subpixel R is a red subpixel. The second primary color is green. Thus, the second subpixel G is a green subpixel.

The first substrate 22 may be a thin film transistor ("TFT") substrate including a plurality of TFTs. The first substrate 22 may further include a plurality of gate lines extending in a first direction and a plurality of data lines extending in a second direction crossing the first direction (e.g., the second direction may be substantially perpendicular to the first direction). The first substrate 22 may further include a pixel electrode.

The second substrate 24 faces the first substrate 22. The second substrate 24 may be a color filter substrate including a plurality of color filters. The second substrate 24 may further include a common electrode.

The first subpixel R may be defined by a red color filter disposed on the second substrate 24. The second subpixel G may be defined by a green color filter disposed on the second substrate 24. The transparent subpixel T may be defined by a transparent filter disposed on the second substrate 24. For example, the transparent filter may be a substantially empty space at which a color filter is not disposed (e.g., may be an open or empty space). A light blocking pattern BM may be disposed between the color filters.

The liquid crystal layer 26 is disposed between the first and second substrates 22 and 24.

Although the color filters are disposed on the second substrate 24 in the present example embodiment, the present invention is not limited thereto.

The panel driver is connected to the display panel 20 to drive the display panel 20. The panel driver may include a timing controller, a gate driver, and a data driver.

The timing controller generates a first control signal to control a driving timing of the gate driver and outputs the first control signal to the gate driver. The timing controller generates a second control signal to control a driving timing of the data driver and outputs the second control signal to the data driver. The gate driver outputs a gate signal to the gate lines. The data driver outputs a data signal to the data lines.

The panel driver sets grayscale data of the first, second, and transparent subpixels R, G, and T.

The panel driver generates a light source control signal to control a driving timing of the light source driver and outputs the light source control signal to the light source driver. The panel driver may be synchronized with the light source driver.

Each of the first and second light source parts includes first light sources 110 and 210 and second light sources 120 and 220. The first and second light source parts generate light and provide the light to the display panel 20.

The first light sources 110 and 210 generate light having a mixed color including the first primary color and the second primary color. In the present example embodiment, the first primary color is red, the second primary color is green, and the mixed color including the first and second primary colors is yellow.

The second light sources 110 and 220 generate light having a third primary color. The third primary color may be blue.

When the first, second, and third primary colors are mixed (e.g., interact) with one another, the mixed or resulting color is white. Although the first, second, and third primary colors are respectively red, green, and blue in the present example embodiment, the present invention is not limited thereto.

In the present example embodiment, each of the first light sources 110 and 210 may be a light emitting diode ("LED") chip which emits a yellow light. Each of the second light sources 120 and 220 may be a LED chip which emits a blue light. Alternatively, the first light sources 110 and 210 may include a blue LED chip and a yellow phosphor.

The light guiding plate 300 guides the light from the first and second light sources 110, 210, 120 and 220 to the display panel 20.

In the present example embodiment, the first light source part may be disposed at a first side of the light guiding plate 300. The second light source part may be disposed at a second side of the light guiding plate 300 opposite to the first side of the light guiding plate 300.

Although the first and second light source parts are each an edge light source part including the first and second light sources 110, 210, 120 and 220 disposed at side portions of the light guiding plate 300 in the present example embodiment, the present invention is not limited thereto. Alternatively, the first and second light source parts may each be a direct light source part including a plurality of light sources disposed under the display panel 20 and corresponding to an entire area of the display panel 20.

Although the display apparatus is the liquid crystal display apparatus including the liquid crystal layer 26, the present invention is not limited thereto. Alternatively, the display apparatus may be organic light emitting diode ("OLED") display apparatus including OLEDs.

The light source driver is coupled to (e.g., connected to) the first and second light source parts. The light source driver drives the first and second light source parts. The light source driver turns on and off (e.g., repeatedly turns on and off) at least one of the first and second light sources 110, 210, 120 and 220.

In the present example embodiment, the light source driver may alternately turn on the first and second light sources 110, 210, 120 and 220. For example, during a first subframe, the first light sources 110 and 210 are turned on and the second light sources 120 and 220 are turned off. During a second subframe, the first light sources 110 and 210 are turned off and the second light sources 120 and 220 are turned on.

A duration of the first subframe may be substantially equal to a duration of the second frame. Alternatively, the duration of the first subframe may be different from the duration of the second frame.

For example, the display panel 20 may display the images at a frame rate of 120 Hz (hertz). The light source driver may alternately turn on the first and second light sources 110, 120, 210 and 220 at a frequency of 120 Hz.

For example, the display panel 20 may display a three-dimensional ("3D") image. The display panel 20 may alternately display a left image and a right image at a frequency of 120 Hz. The display panel 20 displays two left images in a row and two right images in a row. As a result, the display panel 20 displays the images at a frame rate of 240 Hz. In such a case, the light source driver may alternately turn on the first and second light sources 110, 120, 210 and 220 at a frequency of 240 Hz.

The panel driver operates subpixel rendering to set grayscale data of the first subpixel R, the second subpixel G, and the transparent subpixel T.

Herein, A is a grayscale of the first primary color, B is a grayscale of the second primary color, C is a grayscale of the third primary color, and min(A,B) is a minimum value between A and B. Hereinafter, a first subpixel rendering method is described.

During the first subframe, when the first light sources 110 and 210 are turned on, the panel driver may set the grayscale data of the first subpixel R to be A−min(A,B) (that is, A minus min(A,B)), the grayscale data of the second subpixel G to be B−min(A,B) (that is, B minus min(A,B)), and the grayscale data of the transparent subpixel T to be min(A,B).

During the second subframe, when the second light sources 110 and 220 are turned on, the panel driver may set the grayscale data of the transparent subpixel T to be C.

Herein, A is a grayscale of the first primary color, B is a grayscale of the second primary color, and C is a grayscale of the third primary color. Hereinafter, a second subpixel rendering method is described.

During the first subframe, the panel driver may set the grayscale data of the first subpixel R to be A, the grayscale data of the second subpixel G to be B, and the grayscale data of the transparent subpixel T to be A+B (that is, A plus B).

During the second subframe, the panel driver may set the grayscale data of the transparent subpixel T to be 2C (that is, two times C).

In the second subpixel rendering method, the display panel 20 may have a higher luminance compared to the first subpixel rendering method.

According to the present example embodiment, the display panel 20 includes red, green, and transparent subpixels R, G, and T and the light source part 200 includes yellow and blue light sources YL and BL which are repeatedly turned on and off so that power consumption of the display apparatus may be reduced.

Figure 14:
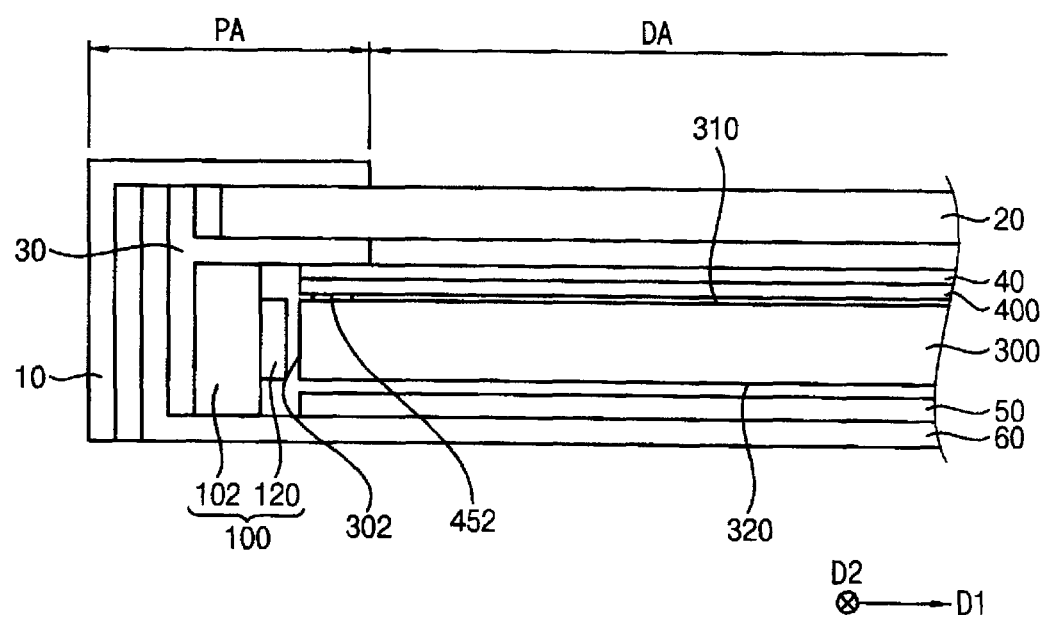
FIG. 14 is a cross-sectional view illustrating a display apparatus according to another example embodiment of the invention.

FIG. 14 is a cross-sectional view illustrating a display apparatus according to another example embodiment of the invention.

Referring to FIG. 14, the display apparatus is substantially similar to or the same as the display apparatus of FIGS. 11 and 12, except for a first sheet 400 including a first phosphor pattern 452. Thus, any further detailed descriptions concerning repeated elements may be briefly described or omitted.

The display apparatus includes a receiving container including a top chassis 10 and a bottom chassis 60, a display panel 20, a mold frame 30, optical elements 40, a first light source part 100, a second light source part 200, a light guiding plate 300, and a reflecting element 50.

The display apparatus may further include a first sheet 400 disposed between the optical elements 40 and the light guiding plate 300. The first sheet 400 includes an upper surface 410 which faces the display panel 20 and a lower surface 420 which is opposite to the upper surface 410 and faces an exiting surface 310 of the light guiding plate 300. A first absorbing pattern absorbing (e.g., partially absorbing) light emitted by the second light source 120 is formed on the upper surface 410. A first phosphor pattern 452 is formed on the lower surface 420. The first sheet 400 is substantially similar to or the same as the first sheet of FIGS. 4 and 5. Thus, any further detailed descriptions concerning repeated elements will be omitted.

Figure 15:
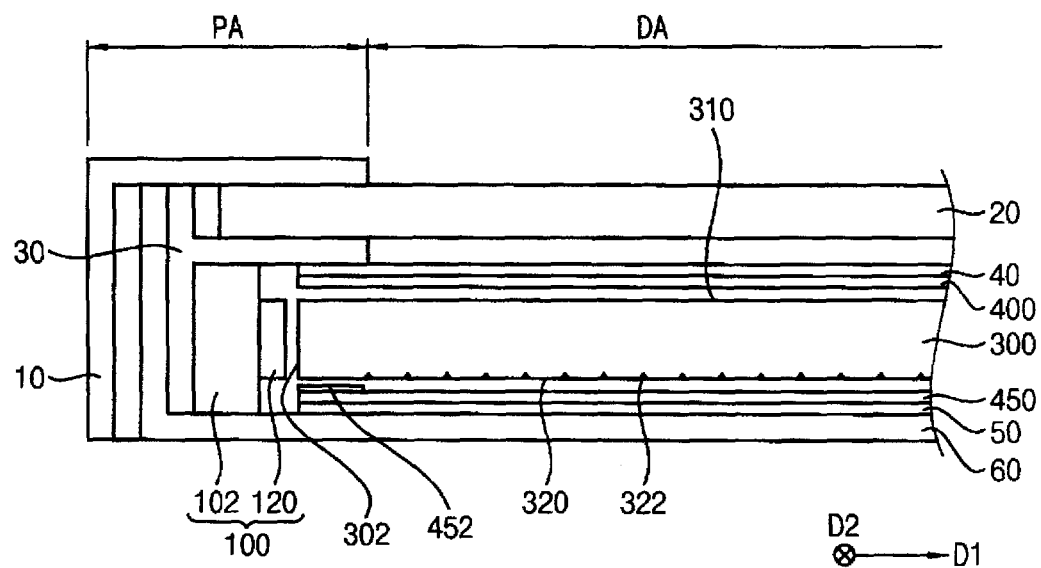
FIG. 15 is a cross-sectional view illustrating a display apparatus according to still another example embodiment of the invention.

FIG. 15 is a cross-sectional view illustrating a display apparatus according to still another example embodiment of the invention.

Referring to FIG. 15, the display apparatus is substantially similar to or the same as the display apparatus shown in FIG. 14, except for first and second sheets 400 and 450. Thus, any further detailed descriptions concerning repeated elements may be briefly described or omitted.

The display apparatus includes a receiving container including a top chassis 10 and a bottom chassis 60, a display panel 20, a mold frame 30, optical elements 40, a first light source part 100, a second light source part 200, a light guiding plate 300, and a reflecting element 50. The display apparatus may further include a second sheet 450 disposed between the reflecting element 50 and the light guiding plate 300. A first phosphor pattern is formed on the second sheet 450. The first and second sheets 400 and 450 are substantially similar to or the same as the first and second sheets shown in FIGS. 6 to 8. Thus, any further detailed descriptions concerning repeated elements will be omitted.

Figure 16:
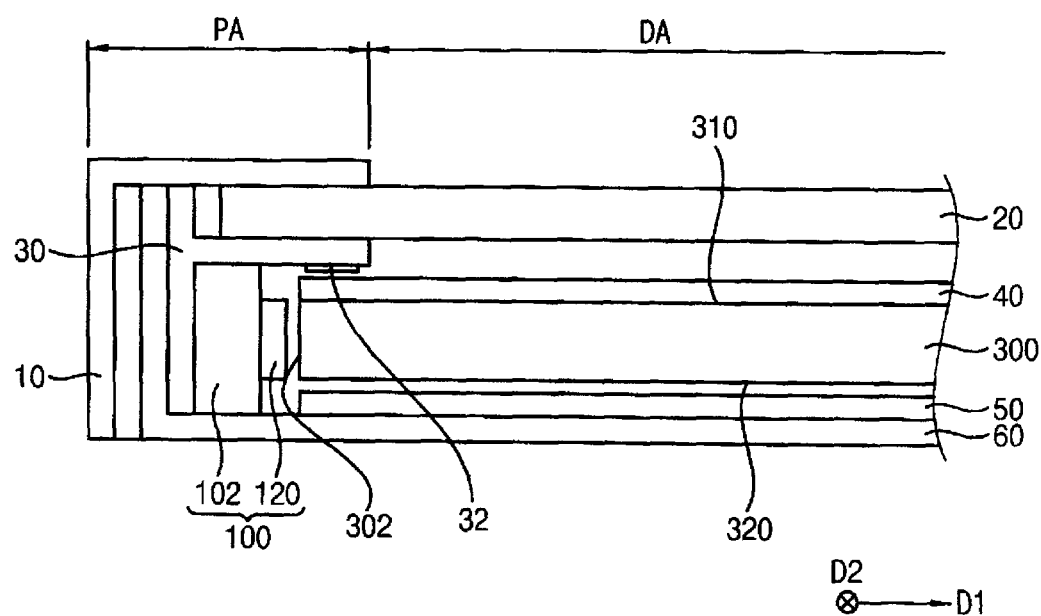
FIG. 16 is a cross-sectional view illustrating a display apparatus according to still another example embodiment of the invention.

FIG. 16 is a cross-sectional view illustrating a display apparatus according to still another example embodiment of the invention.

Referring to FIG. 16, the display apparatus is substantially similar to or the same as the display apparatus shown in FIGS. 11 and 12, except for a first phosphor pattern 32. Thus, any further detailed descriptions concerning repeated elements may be briefly described or omitted.

The first phosphor pattern 32 is disposed between the light guiding plate 300 and the mold frame 30. The first phosphor pattern 32 may change or vary wavelength of light which passes between the light guiding plate 300 and the mold frame 30 emitted by the second light source 120 of the first light source part 100. The first phosphor pattern 32 is substantially similar to or the same as the first phosphor pattern 352 shown in FIG. 1, except for a position of the first phosphor pattern 32. Thus, any further detailed descriptions concerning repeated elements will be omitted.

FIGS. 17A to 19 are perspective views illustrating a method of manufacturing a light guiding plate of a backlight assembly according to an example embodiment of the present invention.

Figure 17A:
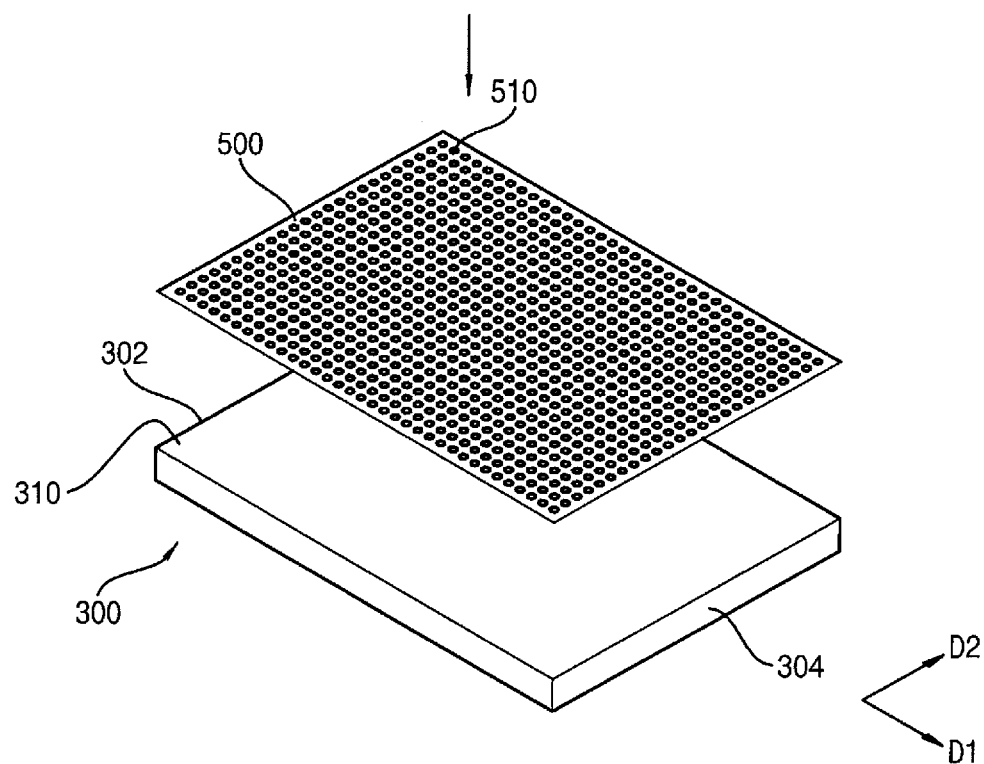
FIGS. 17A to 19 are perspective views illustrating a method of manufacturing a light guiding plate of a backlight assembly according to an example embodiment of the invention.
Figure 17B:
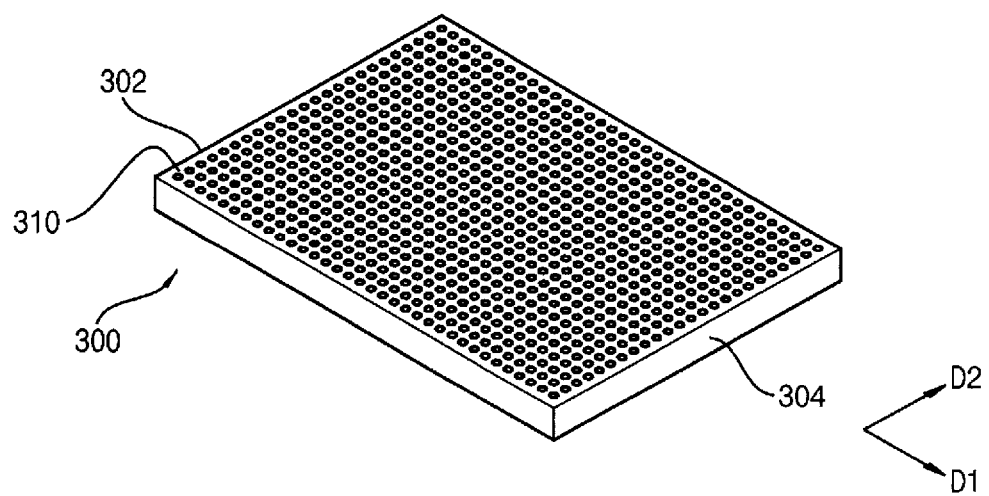

Referring to FIGS. 17A and 17B, a light exiting pattern is formed at or on an exiting surface 310 of a light guiding plate 300 through a first mask 500. The light exiting pattern evenly or uniformly distributes light which exits or passes through the light guiding plate 300.

The light guiding plate 300 includes a first incident surface 302, a second incident surface 304 opposite to the first incident surface 302, and the exiting surface 310 connecting the first incident surface 302 and the second incident surface 304.

For example, the first mask 500 is placed on or over the light guiding plate 300. A plurality of openings 510 are formed in or through the first mask 500. After that, ink including titanium dioxide (e.g., $TiO_2$) and resin is deposited (e.g., transferred) onto the exiting surface 310 though the openings 510 of the first mask 500 to form the light exiting pattern.

Alternatively, a plurality of engraved patterns may be formed on the exiting surface 310 to form the light exiting pattern.

Figure 18A:
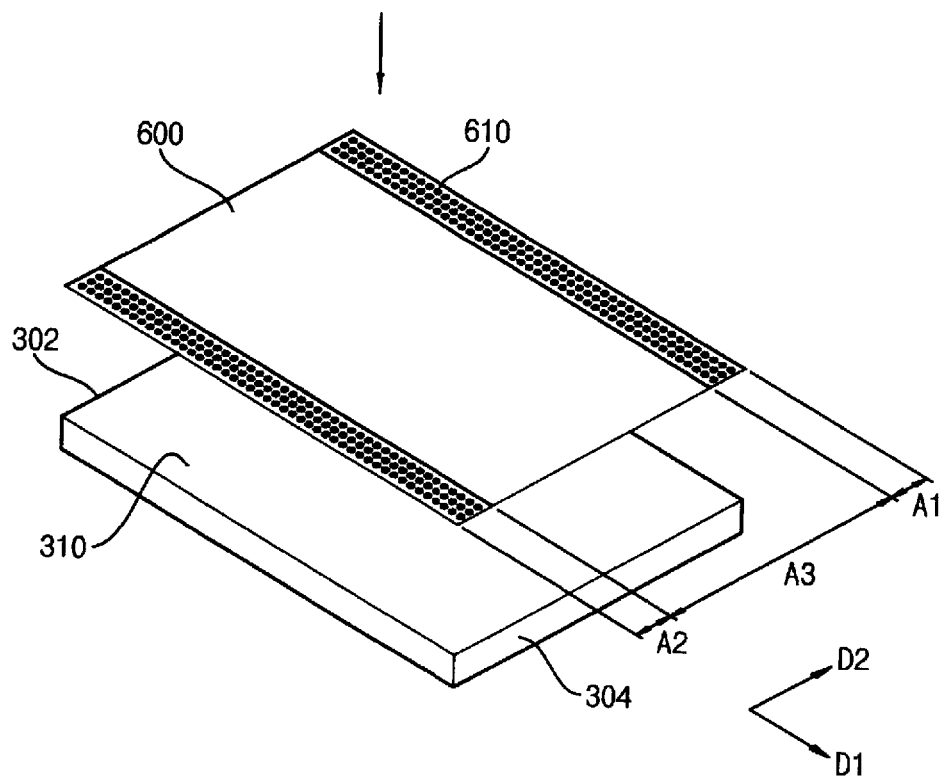
Figure 18B:
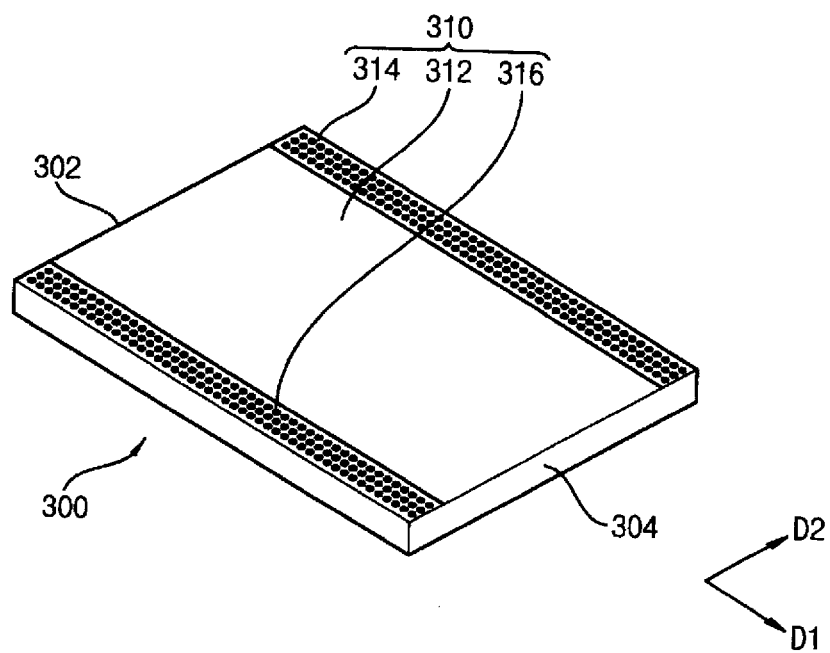

Referring to FIGS. 18A and 18B, a first peripheral portion 314 and a second peripheral portion 316 are formed. The first peripheral portion 314 includes a first absorbing pattern formed at or on exiting surface 310 and configured to absorb light having a wavelength in a range (e.g., light having a wavelength in a specific or predetermined range). The second peripheral portion 316 includes a second absorbing pattern formed at or on exiting surface 310 and configured to absorb light having a wavelength in a range (e.g., light having a wavelength in a specific or predetermined range).

The first peripheral portion 314 and the second peripheral portion 316 extend in a first direction D1 and are spaced from (e.g., spaced apart from) each other. For example, the first peripheral portion 314 and the second peripheral portion 316 may be formed at a boundary of the exiting surface 310 (e.g., at opposite edges of the exiting surface 310).

For example, a second mask 600 is placed on the light guiding plate 300 on which the light exiting pattern is formed. The second mask 600 includes a first portion A1 corresponding to the first peripheral portion 314, a second portion A2 corresponding to the second peripheral portion 316, and a third portion A3 disposed between the first portion A1 and the second portion A2. A plurality of openings 610 are formed in or through the first and second portions A1 and A2. After then, ink is deposited (e.g., transferred) onto the exiting surface 310 though the openings 610 of the second mask 600 to form the first absorbing pattern and the second absorbing pattern. The ink absorbs a range of wavelength of light (e.g., a specific range of wavelength of light).

Figure 19:
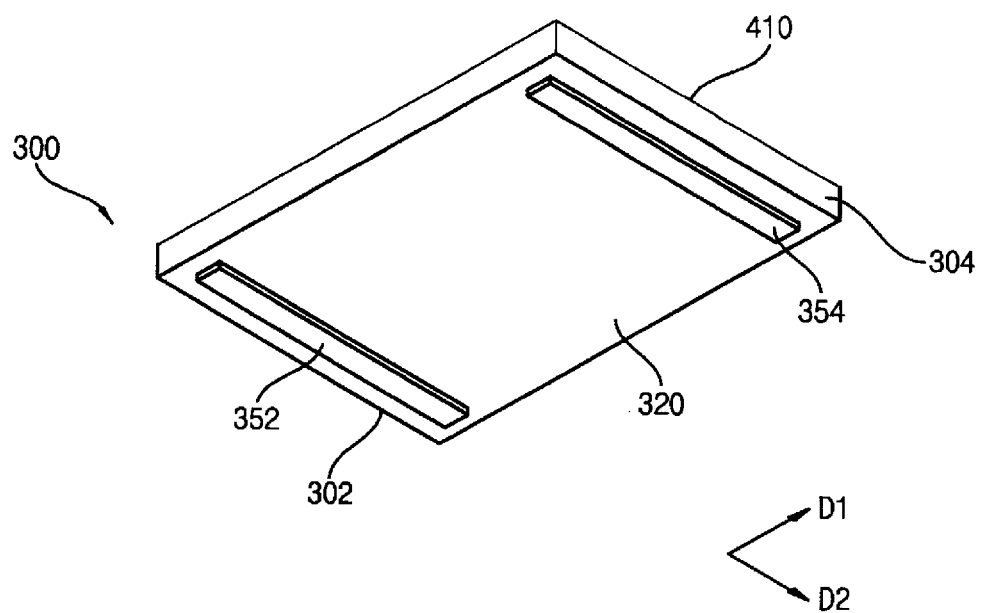

Referring FIG. 19, a first phosphor pattern 352 and a second phosphor pattern 354 are formed on a reflecting surface 320 of the light guiding plate 300. The first and second phosphor patterns 352 and 354 change or vary light having a wavelength (e.g., having a specific wavelength) into white light.

The first and second phosphor patterns 352 and 354 are formed on the reflecting surface 320, are adjacent to the first and second incident surface 302 and 304, and extend in a second direction D2.

The first and second phosphor patterns 352 and 354 may include yellow phosphor. For example, the yellow phosphor may include a YAG:Ce (e.g., $Y_3Al_5O_{12}$:Ce) phosphor such as a yttrium aluminum garnet doped with cerium or a silicate yellow phosphor having a dominant wavelength of about 530 nm to about 570 nm.

The example method of manufacturing the backlight assembly may further include forming a first light source part (e.g., refer to 100 of FIG. 1) and a second light source part (e.g., refer to 200 of FIG. 1). In addition, the example method may further include forming a first sheet (e.g., refer to 400 of FIG. 4) and a second sheet (e.g., refer to 450 of FIG. 6).

According to embodiments of the present invention, the backlight assembly includes light source parts generating light having more than two colors and a light guiding plate having first and second peripheral portions which absorb light having wavelength within a range (e.g., within a specific or predetermined range), such that specific color line stains may be reduced.

In addition, the backlight assembly includes a first phosphor pattern which changes or varies light having the specific wavelength into white light, so that visibility of light leakage adjacent to light sources and hot spot may be reduced.

The foregoing is illustrative of the invention and is not to be construed as limiting thereof. Although a few example embodiments of the invention have been described herein, those skilled in the art will readily appreciate that many modifications are possible to the example embodiments without departing from the spirit and scope of the invention. Accordingly, all such modifications are intended to be included within the scope of the present invention as defined in the claims and their equivalents. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific example embodiments disclosed herein, and that modifications to the disclosed example embodiments, as well as other example embodiments, are intended to be included within the scope of the appended claims and their equivalents. The present invention is defined by the following claims, with equivalents of the claims to be included therein.

What is claimed is:

1. A backlight assembly comprising:
   a first light source part comprising a plurality of first light sources configured to generate light having a first color and a plurality of second light sources configured to generate light having a second color different from the first color, the first and second light sources being alternately located along a first direction; and
   a light guiding plate comprising a first incident surface, a second incident surface, and an exiting surface adjacent to and extending between the first and second incident surfaces, the first light source part facing the first incident surface in a second direction that is perpendicular to the first direction, the exiting surface configured to allow the light to pass therethrough, the exiting surface comprising a first peripheral portion located to correspond to one of the second light sources in the first direction and configured to absorb the light having the second color and a central portion adjacent to the first peripheral portion in the first direction and configured to allow the light to pass therethrough, the first peripheral portion extending from the first incident surface to the second incident surface across the entire length of the light exiting surface in the second direction and being longer in the second direction than in the first direction.

2. The backlight assembly of claim 1, wherein one of the second light sources is at a first end of the first light source part, and
   the first peripheral portion extends from adjacent edges of the light guiding plate in the first and second directions.

3. The backlight assembly of claim 2, wherein a pattern generated utilizing ink and configured to absorb the light having the second color is on the first peripheral portion.

4. The backlight assembly of claim 3, wherein the pattern comprises a plurality of fine dots.

5. The backlight assembly of claim 1, further comprising a first sheet on the exiting surface of the light guiding plate,
wherein an upper surface of the first sheet comprises a first peripheral portion, and
the first peripheral portion of the upper surface comprises a pattern generated utilizing ink and configured to absorb the light having the second color.

6. The backlight assembly of claim 1, further comprising a second sheet under the light guiding plate,
wherein a first phosphor pattern is on the second sheet, adjacent to the first incident surface, and extends substantially parallel to the first incident surface, and
the first phosphor pattern comprises phosphor configured to change the light having the second color into white light.

7. The backlight assembly of claim 1, wherein the light guiding plate further comprises a reflecting surface opposite to the exiting surface and a first phosphor pattern adjacent to the first incident surface and extending substantially parallel to the first incident surface, and
the first phosphor pattern comprises phosphor configured to change the light having the second color into white light.

8. The backlight assembly of claim 1, wherein one of the second light sources is at each of a first end and a second end of the first light source part, the second end of the first light source part being opposite to the first end of the first light source part,
wherein the exiting surface of the light guiding plate further comprises a second peripheral portion,
the second peripheral portion is located to correspond to the one of the second light sources at the second end of the first light source part and extends substantially perpendicular to the first incident surface, and
the second peripheral portion is configured to partially absorb the light having the second color.

9. The backlight assembly of claim 1, further comprising a second light source part facing the first light source part,
wherein the second light source part comprises a plurality of first light sources configured to generate light having the first color; and a plurality of second light sources configured to generate light having the second color different from the first color, the first and second light sources being alternately located,
one of the second light sources being at a first end of the first light source part, and
the light guiding plate being between the first light source part and the second light source part.

10. The backlight assembly of claim 1, wherein a wavelength of the light having the first color is greater than a wavelength of the light having the second color.

11. The backlight assembly of claim 10, wherein the first color is yellow and the second color is blue.

12. A display apparatus comprising:
a display panel comprising a first subpixel configured to display a first primary color, a second subpixel configured to display a second primary color, and a transparent subpixel;
a backlight assembly configured to provide light to the display panel, the backlight assembly comprising:
a first light source part comprising a plurality of first light sources configured to generate light having a first color and a plurality of second light sources configured to generate light having a second color different from the first color, the first and second light sources being alternately located in a first direction, the first color being a mixed color comprising the first primary color and the second primary color, the second color being a third primary color; and
a light guiding plate comprising a first incident surface, a second incident surface, and an exiting surface, the exiting surface being adjacent to and extending between the first and second incident surfaces in a second direction perpendicular to the first direction and comprising:
a first peripheral portion configured to partially absorb the light having the second color and extending from the first incident surface to the second incident surface in the second direction across the entire length of the light exiting surface; and
a central portion adjacent to the first peripheral portion in the first direction and configured to allow the light to pass therethrough; and
a receiving container accommodating the display panel and the backlight assembly.

13. The display apparatus of claim 12, wherein the first primary color is red, the second primary color is green, the third primary color is blue, and the first color is yellow.

14. The display apparatus of claim 13, wherein the display panel comprises a display area configured to display an image and a peripheral area surrounding the display area which is a non-displaying area,
the light guiding plate further comprises a first phosphor pattern adjacent to the first incident surface and extending substantially parallel to the first incident surface,
the first phosphor pattern comprises phosphor configured to change the light having the second color into white light, and
the first phosphor pattern being located to correspond to the peripheral area of the display panel.

15. The display apparatus of claim 13, further comprising a first sheet on the exiting surface of the light guiding plate,
wherein an upper surface of the first sheet comprises a first peripheral portion, the first peripheral portion of the upper surface comprising a pattern generated utilizing ink and configured to partially absorb the light having the second color.

16. The display apparatus of claim 15, wherein a first phosphor pattern is on a lower surface of the first sheet adjacent to the first incident surface and extends substantially parallel to the first incident surface, the lower surface of the first sheet being opposite to the upper surface of the first sheet, and
the first phosphor pattern comprises phosphor configured to change the light having the second color into white light.

17. A method of manufacturing a backlight assembly comprising:
forming a first light source part, the first light source part comprising a plurality of first light sources configured to generate light having a first color and a plurality of second light sources configured to generate light having a second color different from the first color, the first and second light sources being alternately located; and
forming a light guiding plate, the light guiding plate comprising a first incident surface, a second incident surface, an exiting surface adjacent to and extending between the first and second incident surfaces and configured to allow the light to pass therethrough, and a reflecting surface opposite to the exiting surface,
wherein forming the light guiding plate comprises:

forming a light exiting pattern on the exiting surface; and forming first and second absorbing patterns by depositing ink on the exiting surface through a mask, the mask comprising a first portion having a plurality of openings and having a length corresponding to a length of the exiting surface between the first and second incident surfaces, a second portion spaced from the first portion and having a plurality of openings and having a length corresponding to the length of the exiting surface between the first and second incident surfaces, and a third portion between the first portion and the second portion and having a length corresponding to the length of the exiting surface between the first and second incident surfaces, the ink configured to absorb light having a wavelength within a range.

* * * * *